US011657552B2

(12) United States Patent
Fiser et al.

(10) Patent No.: US 11,657,552 B2
(45) Date of Patent: May 23, 2023

(54) GENERATING ILLUMINATED TWO-DIMENSIONAL VECTOR GRAPHICS USING PATH TRACING

(71) Applicant: Adobe Inc., San Jose, CA (US)

(72) Inventors: Jakub Fiser, Milton Keynes (GB); Ankit Phogat, Noida (IN); Vineet Batra, Pitam Pura (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/496,231

(22) Filed: Oct. 7, 2021

(65) Prior Publication Data

US 2023/0110680 A1    Apr. 13, 2023

(51) Int. Cl.
*G06T 11/00* (2006.01)
*G06T 11/40* (2006.01)
(Continued)

(52) U.S. Cl.
CPC .............. *G06T 11/40* (2013.01); *G06F 18/22* (2023.01); *G06T 7/11* (2017.01); *G06T 7/90* (2017.01);
(Continued)

(58) Field of Classification Search
CPC ........ G06T 11/001; G06T 11/40; G06T 11/60; G06T 15/50; G06T 15/001; G06T 7/11;
(Continued)

(56) References Cited

U.S. PATENT DOCUMENTS 10,242,464 B1    3/2019    Phogat et al.
10,489,946 B1    11/2019   Batra et al.
(Continued)

FOREIGN PATENT DOCUMENTS

WO    WO-2007090974 A2 *    8/2007    ............. G06T 15/50

OTHER PUBLICATIONS

Atsuyuki Okabe, Barry Boots, Kokichi Suihara, and Sung Nok Chiu in "Spatial tessellations: Concepts and applications of Voronoi diagrams, 2nd edition" (2000) (abstract).
(Continued)

*Primary Examiner* — Wesner Sajous
(74) *Attorney, Agent, or Firm* — Keller Preece PLLC

(57) ABSTRACT

Methods, systems, and non-transitory computer readable storage media are disclosed for utilizing ray-tracing and mesh generation to illuminate two-dimensional digital vector images. In response to inserting a light source into a two-dimensional digital vector image including one or more vector elements, the disclosed system embeds the vector element(s) into a polygonal mesh generated for a region of the digital vector image. The disclosed system samples a plurality of rays at a plurality of points within the region and detect intersections of the rays with the vector element(s) or a bounding shape surrounding the region. Additionally, the disclosed system determines color values for mesh points in the polygonal mesh based on the intersections of the rays by interpolating color values associated with the intersected points. Furthermore, in some embodiments, the disclosed system subdivides the polygonal mesh according to a priority queue based on error scores associated with the determined color values.

20 Claims, 13 Drawing Sheets

(51) Int. Cl.
   *G06T 7/90* (2017.01)
   *G06K 9/62* (2022.01)
   *G06V 10/22* (2022.01)
   *G06T 7/11* (2017.01)
   *G06F 18/22* (2023.01)

(52) U.S. Cl.
   CPC .......... *G06T 11/001* (2013.01); *G06V 10/225* (2022.01); *G06T 2207/20021* (2013.01); *G06T 2210/12* (2013.01)

(58) Field of Classification Search
   CPC ................ G06T 7/90; G06T 3/4007; G06T 2207/20021; G06T 2210/12; G06K 9/6215; G06V 10/225; G09G 3/2059; G09G 3/22; G09G 3/3406; G09G 5/10
   See application file for complete search history.

(56) References Cited

U.S. PATENT DOCUMENTS

| | | | |
|---|---|---|---|
| 10,902,665 B2 * | 1/2021 | Sun | G06T 15/005 |
| 10,935,861 B1 * | 3/2021 | Rhodes | G02F 1/13338 |
| 11,423,607 B2 * | 8/2022 | Lino | G06T 19/20 |

OTHER PUBLICATIONS

Julian Rimoli in "Barycentric subdivision meshes in computational solid mechanics" in NSF Workshop on Barycentric Coordinates in Geometry Processing and Finite/Boundary Element Methods (2012).

* cited by examiner

GENERATING ILLUMINATED TWO-DIMENSIONAL VECTOR GRAPHICS USING PATH TRACING

BACKGROUND

Vector-based graphics are an important component in many digital graphics environments. Specifically, vector-based graphics provide lossless scaling of images for achieving resolution independence, which is particularly useful in converting digital images to print. Additionally, although providing photorealism in two-dimensional graphics generated via digital image editing applications is challenging, especially in vector-based graphics, integration of artificial illumination and shadows into digital images can provide complex and realistic visualizations of two-dimensional objects and scenes. Conventional systems, however, suffer from a number of shortcomings with regard to the flexibility, efficiency, and accuracy of generating realistic illumination and shading effects in two-dimensional digital images.

SUMMARY

This disclosure describes one or more embodiments of methods, non-transitory computer readable media, and systems that solve the foregoing problems (in addition to providing other benefits) by utilizing ray-tracing and mesh generation to illuminate two-dimensional digital vector images. Specifically, in a two-dimensional digital vector image including one or more vector elements, the disclosed systems embed the vector element(s) into a polygonal mesh (e.g., a triangular mesh) generated for a region of the digital vector image. The disclosed systems sample a plurality of rays at a plurality of points within the region and detect intersections of the rays with the vector element(s) or a bounding shape surrounding the region. Additionally, the disclosed systems determine color values for mesh points in the polygonal mesh based on the intersections of the rays by interpolating color values associated with the intersected points. Furthermore, in some embodiments, the disclosed systems subdivide the polygonal mesh according to a priority queue based on error scores associated with the determined color values. The disclosed systems thus utilize ray-tracing to determine color values for mesh points in a polygonal mesh to illuminate two-dimensional digital vector images accurately, effectively, and flexibly.

BRIEF DESCRIPTION OF THE DRAWINGS

Various embodiments will be described and explained with additional specificity and detail through the use of the accompanying drawings in which.

DETAILED DESCRIPTION

Figure 1:
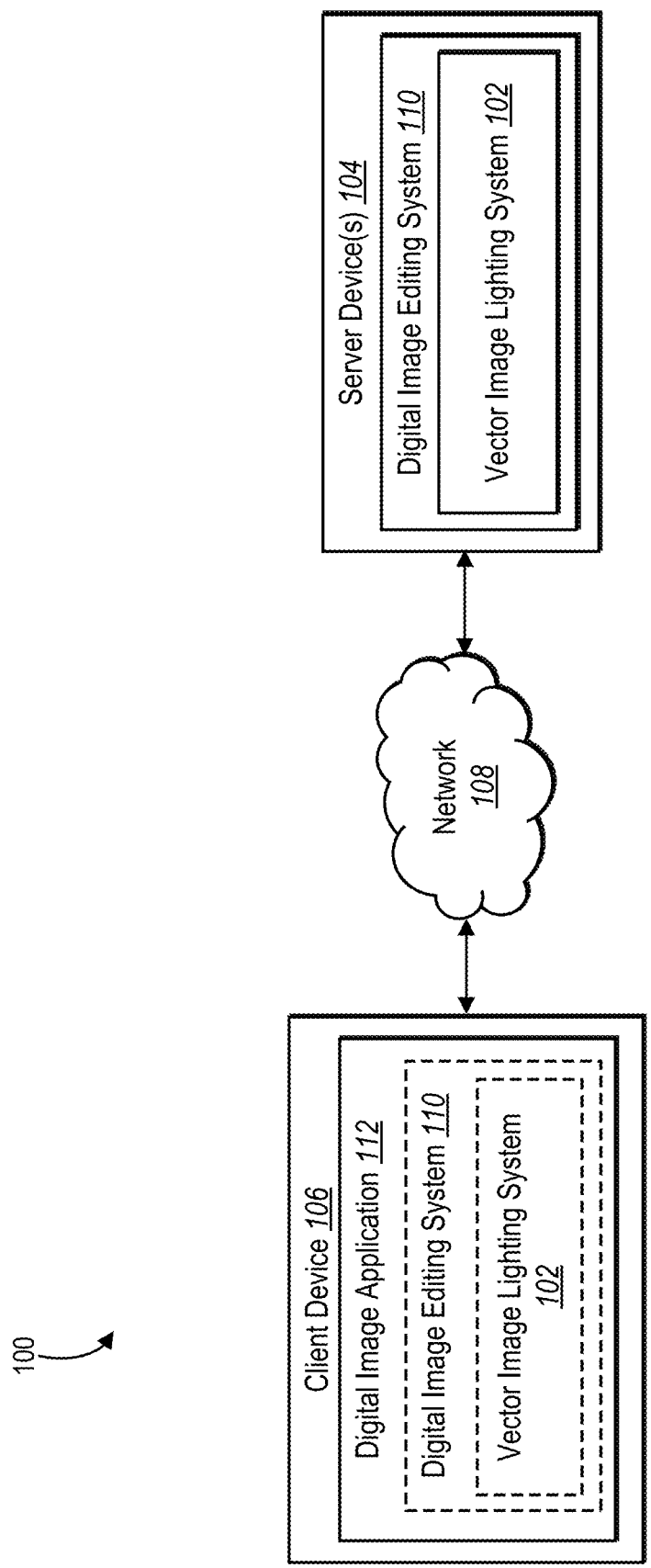
FIG. 1 illustrates an example system environment in which a vector image lighting system can operate in accordance with one or more implementations.

This disclosure describes one or more embodiments of a vector image lighting system that illuminates two-dimensional digital vector images utilizing ray-tracing and a polygonal mesh. In one or more embodiments, the vector image lighting system embeds one or more vector elements of a two-dimensional digital vector image within a polygonal mesh (e.g., a triangular mesh) generated for a region including the one or more vector elements. Additionally, the vector image lighting system samples rays from one or more light sources at a plurality of locations within the region and detects intersections of the rays with the vector element(s) or a bounding shape that encloses the region. The vector image lighting system then utilizes interpolation to determine colors for mesh points in the polygonal mesh based on the sampled rays and the corresponding intersections. Furthermore, in one or more implementations, the vector image lighting system lights the two-dimensional digital vector image without intermediate rasterization. The vector image lighting system thus modifies the two-dimensional digital vector image to include the determined color values for the mesh points and illuminate the two-dimensional digital vector image to simulate complex light interactions.

As mentioned, in one or more embodiments, the vector image lighting system embeds vector elements of a two-dimensional digital vector image into a polygonal mesh. Specifically, the vector image lighting system generates a bounding shape that encloses one or more vector elements. The vector image lighting system also generates a polygonal mesh including a plurality of connected mesh points. Additionally, in connection with generating the polygonal mesh, the vector image lighting system embeds the one or more vector elements by incorporating vertices of the one or more vector elements into the polygonal mesh with the mesh points.

In one or more additional embodiments, after embedding one or more vector elements of the two-dimensional digital vector image within the polygonal mesh, the vector image lighting system utilizes ray-tracing to sample rays within the two-dimensional digital vector image from one or more light sources. In particular, the vector image lighting system samples rays for a plurality of points in the region of the two-dimensional digital vector image including the polygonal mesh. For example, the vector image lighting system samples rays from a plurality of points in the region to determine intersections of the rays with the one or more vector elements or the bounding shape within the region.

According to one or more embodiments, the vector image lighting system determines color values for mesh points in the polygonal mesh based on the sampled rays. For instance, the vector image lighting system utilizes color values associated with the locations of the intersections of the rays to determine the color values of the mesh points. To illustrate, the vector image lighting system utilizes interpolation to determine a color value for each of the mesh points in the polygonal mesh. More specifically, the vector image lighting system interpolates the color values for the mesh points based on whether the plurality of rays intersect with the one or more vector elements or the bounding shape surrounding the region of the two-dimensional digital vector image.

In one or more further embodiments, the vector image lighting system subdivides the polygonal mesh to increase the accuracy of the illumination from the one or more light sources. Specifically, the vector image lighting system subdivides the polygonal mesh by determining error scores associated with determining the color values of the mesh points. For example, the vector image lighting system determines an error score for a given segment based on a measured (e.g., sampled) color value and an estimated (e.g., interpolated) color value for a midpoint of the segment. The vector image lighting system inserts the segments into a priority queue based on the corresponding error scores and then subdivides the polygonal mesh according to the priority queue. In connection with subdividing the polygonal mesh, the vector image lighting system assigns color values to the newly created midpoints and inserts the subdivided edges back into the priority queue according to the corresponding error scores.

Conventional image processing systems have a number of shortcomings in relation to flexibility, efficiency, and accuracy of operation. For example, many image processing systems utilize ray-tracing to simulate illumination from light sources in digitally generated or modified images. Specifically, conventional image processing systems utilize ray-tracing in three-dimensional images or in raster images to simulate the effect of light paths traveling in space and interacting with objects. While these conventional image processing systems are capable of simulating light propagation in three-dimensional spaces and raster images, the image processing systems are unable to utilize conventional methods of ray-tracing in vector-based graphics due to the characteristics of vector images.

Furthermore, conventional image processing systems that simulate light propagation in raster images are often inefficient. In particular, ray-tracing in raster images requires determining color values for each pixel of a raster image by sampling a large number of rays for every pixel to obtain a noise-free image (or an image with an acceptable amount of noise). More specifically, the conventional image processing systems perform a large number of ray-tracing samples per pixel to accurately accumulate emitted colors from light sources. Thus, the conventional systems often utilize a significant amount of processing resources to sample rays to reduce or eliminate noise in the image. Additionally, limiting the number of ray-tracing samples to reduce processing requirements and processing times (e.g., based on a computing budget) often results in inaccurate light propagation estimations with a noticeable amount of noise.

The disclosed vector image lighting system provides a number of advantages over conventional systems. For example, the vector image lighting system improves the flexibility of computing systems that process digital images. Specifically, in contrast to conventional systems that are limited to performing ray-tracing illumination in resolution dependent raster images, the vector image lighting system utilizes ray-tracing to illuminate vector-based graphics. More specifically, by embedding vector elements within a polygonal mesh and determining color values for the mesh points in the polygonal mesh, the vector image lighting system provides ray-tracing illumination of two-dimensional digital vector images.

Furthermore, the vector image lighting system improves the efficiency of computing systems that illuminate digital images. For instance, by prioritizing a mesh subdivision process based on error scores associated with segments of a polygonal mesh, the vector image lighting system more efficiently increases illumination details in one or more portions of a digital vector image. In particular, in contrast to the conventional systems that sample large numbers of rays per pixel to eliminate noise, the vector image lighting system generates high-quality illumination details while limiting the number of rays sampled via efficient prioritization in locations that are most useful for providing the desired accuracy. Indeed, the vector image lighting system need only sample positions within the mesh rather than at every pixel which greatly increases efficiency.

The vector image lighting system also improves the accuracy of computing systems that illuminate digital images. Specifically, utilizing ray-tracing to determine color values of mesh points in a dynamically subdivided polygonal mesh provides accurate illumination of a two-dimensional digital vector image. Additionally, by enclosing the polygonal mesh and vector elements within a bounding shape and using a color of the bounding shape for ray intersections with the bounding shape, the vector image lighting system simulates the effect of rays that leave the scene without hitting vector elements. The vector image lighting system thus provides ray-tracing illumination in digital vector images that conventional systems are unable to achieve.

Turning now to the figures, FIG. 1 includes an embodiment of a system environment 100 in which a vector image lighting system 102 is implemented. In particular, the system environment 100 includes server device(s) 104 and a client device 106 in communication via a network 108. Moreover, as shown, the server device(s) 104 include a digital image editing system 110, which includes the vector image lighting system 102. Additionally, the client device 106 includes a digital image application 112, which optionally includes the digital image editing system 110 and the vector image lighting system 102.

As shown in FIG. 1, in one or more implementations, the server device(s) 104 includes or hosts the digital image editing system 110. Specifically, the digital image editing system 110 includes, or is part of, one or more systems that implement digital image processing. For example, the digital image editing system 110 provides tools for viewing, generating, editing, and/or otherwise interacting with digital images including digital vector images. To illustrate, the digital image editing system 110 communicates with the client device 106 via the network 108 to provide the tools for display and interaction via the digital image application 112 at the client device 106. Additionally, in some embodiments, the digital image editing system 110 receives data from the client device 106 in connection with editing digital images, including requests to access digital images stored at the server device(s) 104 (or at another device) and/or requests to store digital images from the client device 106 at the server device(s) 104 (or at another device). In some embodiments, the digital image editing system 110 receives interaction data for viewing, generating, or editing a digital image from the client device 106, processes the interaction data (e.g., to view, generate, or edit a digital image), and then provides the results of the interaction data to the client device 106 for display via the digital image application 112 or to a third-party system.

Furthermore, in some embodiments, the digital image editing system 110 provides tools for generating and editing two-dimensional digital vector images. In one or more embodiments, a two-dimensional digital vector image (or "digital vector image") refers to a digital image in a two-dimensional space including one or more mathematical paths to form lines, curves, or shapes within the digital image. For example, a digital vector image includes one or more vector elements made up of one or more straight lines or curves forming one or more shapes. In one or more embodiments, each line or curve in a vector element includes at least two vertices (e.g., at least two end points). Additionally, a line or curve in a vector element can include one or more points along the line or curve. In some embodiments, a digital vector image includes image content stored in vector file formats such as SVG, EPS, and PDF.

In one or more embodiments, the digital image editing system 110 provides tools for inserting light sources into digital vector images. In particular, the digital image editing system 110 utilizes the vector image lighting system 102 to illuminate digital vector images based on one or more light sources positioned within the digital vector images. For example, in connection with one or more light sources inserted into a digital vector image (e.g., at an arbitrary point within the digital vector image or by indicating a vector element as a light source), the vector image lighting system 102 generates a polygonal mesh with one or more vector elements of the digital vector image embedded within the polygonal mesh. To illustrate, the vector image lighting system 102 generates a bounding shape enclosing a region of the digital vector image including the vector element(s). The vector image lighting system 102 then generates the polygonal mesh within the region based on the bounding shape.

According to one or more embodiments, a polygonal mesh includes a connected structure of vertices and polygons. For instance, a polygonal mesh includes a triangular mesh with a plurality of mesh points (i.e., vertices within a mesh) that form a plurality of triangular faces across a portion of a digital vector image. In alternative embodiments, a polygonal mesh includes a quadrilateral mesh with a plurality of mesh points that form a plurality of quadrilateral faces across a portion of a digital vector image. In additional embodiments, a polygonal mesh includes a combination of two or more types of polygons (e.g., a mixed triangular and quadrilateral mesh). Furthermore, in one or more embodiments, the vector image lighting system 102 incorporates existing vector elements of a digital vector image into a polygonal mesh by connecting vertices of the existing vector elements to mesh points of the polygonal mesh.

In additional embodiments, the vector image lighting system 102 assigns color values to mesh points in a polygonal mesh inserted into a digital vector image based on light sources in, or at a border of, the digital vector image. Specifically, the vector image lighting system 102 samples a plurality of rays within the region of the digital vector image including the polygonal mesh and determines intersections with the vector element(s) or bounding shape. The vector image lighting system 102 then interpolates color values for the mesh points based on color values corresponding to the intersections. Accordingly, the vector image lighting system 102 utilizes ray-tracing to simulate light propagation within two-dimensional digital vector images based on color values assigned to mesh points of polygonal meshes generated within the digital vector images.

In one or more embodiments, after modifying a digital vector image after the insertion of one or more light sources via the vector image lighting system 102, the digital image editing system 110 provides the modified digital vector image to the client device 106 via the network 108. For instance, the digital image editing system 110 provides the modified digital vector image for rendering at the client device 106 on a display device using the digital image application 112. Additionally, in some embodiments, the client device 106 receives additional inputs to further modify the digital vector image, such as inputs to change attributes or positions of one or more light sources or one or more vector elements in the digital vector image. The client device 106 sends data to the digital image editing system 110 for further modifying the digital vector image (e.g., utilizing the vector image lighting system 102) and then provides the further modified digital vector image to the client device 106 for display.

In one or more embodiments, the server device(s) 104 include a variety of computing devices, including those described below with reference to FIG. 8. For example, the server device(s) 104 includes one or more servers for storing and processing data associated with digital images. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 8. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with a variety of digital content (e.g., digital vector images). In some embodiments, the client device 106 also performs functions for generating, capturing, or accessing data to provide to the digital image editing system 110 and the vector image lighting system 102 in connection with two-dimensional digital vector images. For example, the client device 106 communicates with the server device(s) 104 via the network 108 to provide information (e.g., user interactions) associated with illuminating digital vector images. Although FIG. 1 illustrates the system environment 100 with a single client device 106, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 8.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the vector image lighting system 102 being implemented by a particular component and/or device within the system environment 100, the vector image lighting system 102 can be implemented, in whole or in part, by other computing devices and/or components in the system environment 100 (e.g., the client device 106).

In particular, in some implementations, the vector image lighting system 102 on the server device(s) 104 supports the vector image lighting system 102 on the client device 106. For instance, the vector image lighting system 102 on the server device(s) 104 generates or trains the vector image lighting system 102. The server device(s) 104 provides the trained vector image lighting system to the client device 106. In other words, the client device 106 obtains (e.g., downloads) the vector image lighting system 102 from the server device(s) 104. At this point, the client device 106 is able to utilize the vector image lighting system 102 to light a digital image independent from the server device(s) 104.

In alternative embodiments, the vector image lighting system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform digital image generation and editing operations, and, in response, the vector image lighting system 102 or the digital image editing system 110 on the server device(s) 104 performs operations to generate and/or edit digital images. The server device(s) 104 then provide the output or results of the operations to the client device 106.

Figure 2:
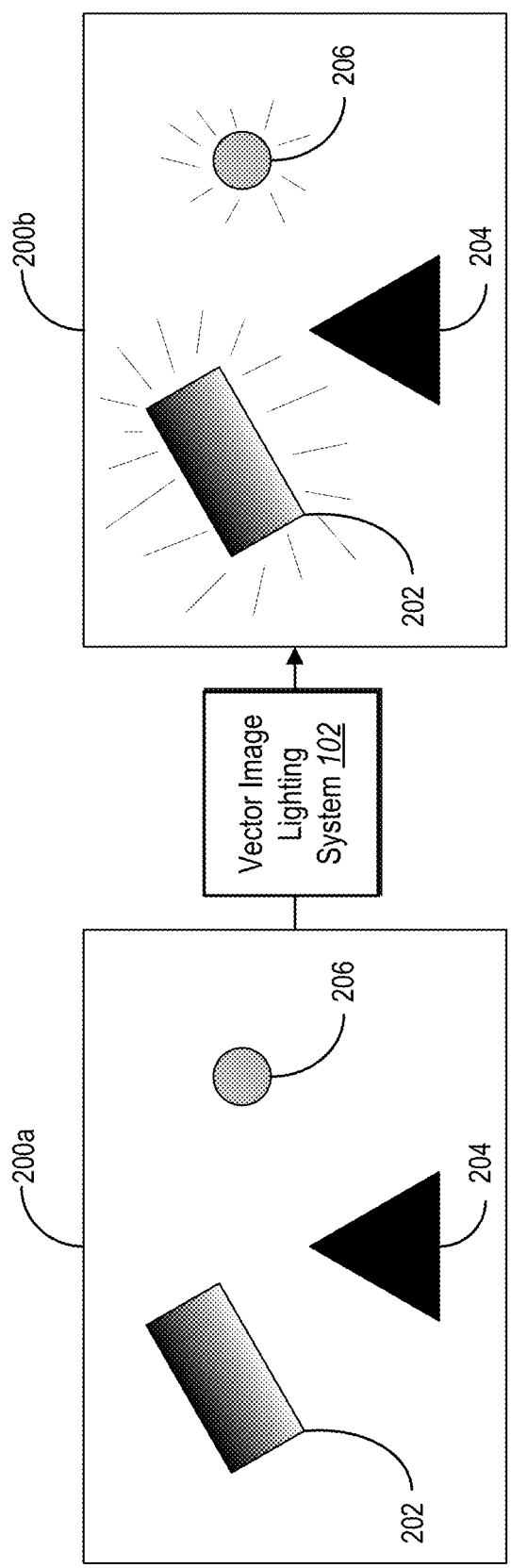
FIG. 2 illustrates a diagram of the vector image lighting system illuminating a two-dimensional digital vector image utilizing ray-tracing and a polygonal mesh in accordance with one or more implementations.

As mentioned, the vector image lighting system 102 illuminates two-dimensional digital vector images using ray-tracing by inserting polygonal meshes into the digital vector images and assigning color values to the mesh points in the polygonal meshes. FIG. 2 illustrates the vector image lighting system 102 modifying a digital vector image 200a based on light sources inserted into the digital vector image 200a. In particular, FIG. 2 illustrates that the vector image lighting system 102 generates a modified digital vector image 200b by utilizing ray-tracing with a polygonal mesh to determine color values for points in spaces outside of existing vector elements.

For example, the vector image lighting system 102 determines a region of the digital vector image 200a including one or more vector elements. Specifically, FIG. 2 illustrates that the digital vector image 200a includes a plurality of vector elements in a plurality of locations within the digital vector image 200a. To illustrate, the digital vector image 200a includes a first vector element 202, a second vector element 204, and a third vector element 206. In one or more embodiments, the vector elements of a digital vector image 200a include closed or open shapes made from one or more paths (e.g., lines or curves).

Additionally, in one or more embodiments, the digital vector image 200a includes one or more light sources at one or more locations. For instance, the digital vector image 200a includes the first vector element 202 as a first light source and the second vector element 204 as a second light source. As illustrated in FIG. 2, in various embodiments, light sources include solid colors (e.g., in the second vector element 204) or varied colors (e.g., a color gradient in the first vector element 202). Furthermore, in one or more embodiments, a light source is not tied to a visible vector element, but is instead positioned at a particular location within a digital vector image such as at an edge of a digital vector image or at a selected location within the digital vector image. To illustrate, a light source (with no easily discernable shape or boundary) can be positioned in a space within a portion of a digital vector image.

In one or more embodiments, one or more vector elements within a digital vector image do not have light source attributes. Specifically, a vector element including one or more vertices can include color values assigned to one or more paths and/or one or more shapes of the vector element. As mentioned, for example, FIG. 2 illustrates that the digital vector image 200a includes the third vector element 206. In one or more embodiments, the vector image lighting system 102 determines that the third vector element 206 is not indicated as a light source (e.g., does not have light source attributes). A digital vector element can include any number of vector elements that have light source attributes and any number of vector elements that do not have light source attributes.

In additional embodiments, a single vector element includes one or more portions with light source attributes and one or more portions without light source attributes. For instance, the vector image lighting system 102 determines that a first portion of a vector element has light source attributes and a second portion of the vector element without light source attributes. In one example, the vector image lighting system 102 determines that a first side of a path vector element has light source attributes and a second side (e.g., an opposite side) of the path vector element does not have light source attributes.

In one or more embodiments, the vector image lighting system 102 determines that different portions of a single vector element have different light source attributes. Specifically, the vector image lighting system 102 determines that a first path or vertex of a vector element has first light source attributes. The vector image lighting system 102 also determines that a second path or vertex of the vector element has second light source attributes (e.g., a different color than the first path or vector). Accordingly, the vector image lighting system 102 determine one or more sets of light source attributes for each vector element within a digital vector image.

After determining the light source attributes, the vector image lighting system 102 generates a modified digital vector image 200b based on the light source attributes. In particular, the vector image lighting system 102 utilizes ray-tracing (also referred to as "path tracing") by sampling a plurality of rays from a plurality of different points in the digital vector image 200a and detecting hit points for the sampled rays. For instance, the vector image lighting system 102 determines whether the rays intersect with any of the vector elements within the digital vector image 200a. The vector image lighting system 102 also determines whether rays leave the scene without intersecting the vector elements by generating a bounding shape (e.g., a vector element) surrounding the scene including the vector elements and then determining whether rays intersect with the bounding shape.

In response to determining the intersections of sampled rays with the vector elements (e.g., with vector elements including light source parameters or vector elements without light source parameters) or with a bounding shape, the vector image lighting system 102 determines color values for portions of the a digital vector image. Specifically, the vector image lighting system 102 assigns color values to mesh points within a polygonal mesh generated for a portion of the digital vector image 200a including the vector elements. To illustrate, the vector image lighting system 102 generates a bounding shape including the first vector element 202, the second vector element 204, and the third vector element 206. The vector image lighting system 102 then assigns color values to the mesh points in the polygonal mesh by interpolating from the intersection points of the sampled rays to the mesh points. The vector image lighting system 102 thus generates the modified digital vector image 200b including the mesh points with the assigned color values.

Figure 3:
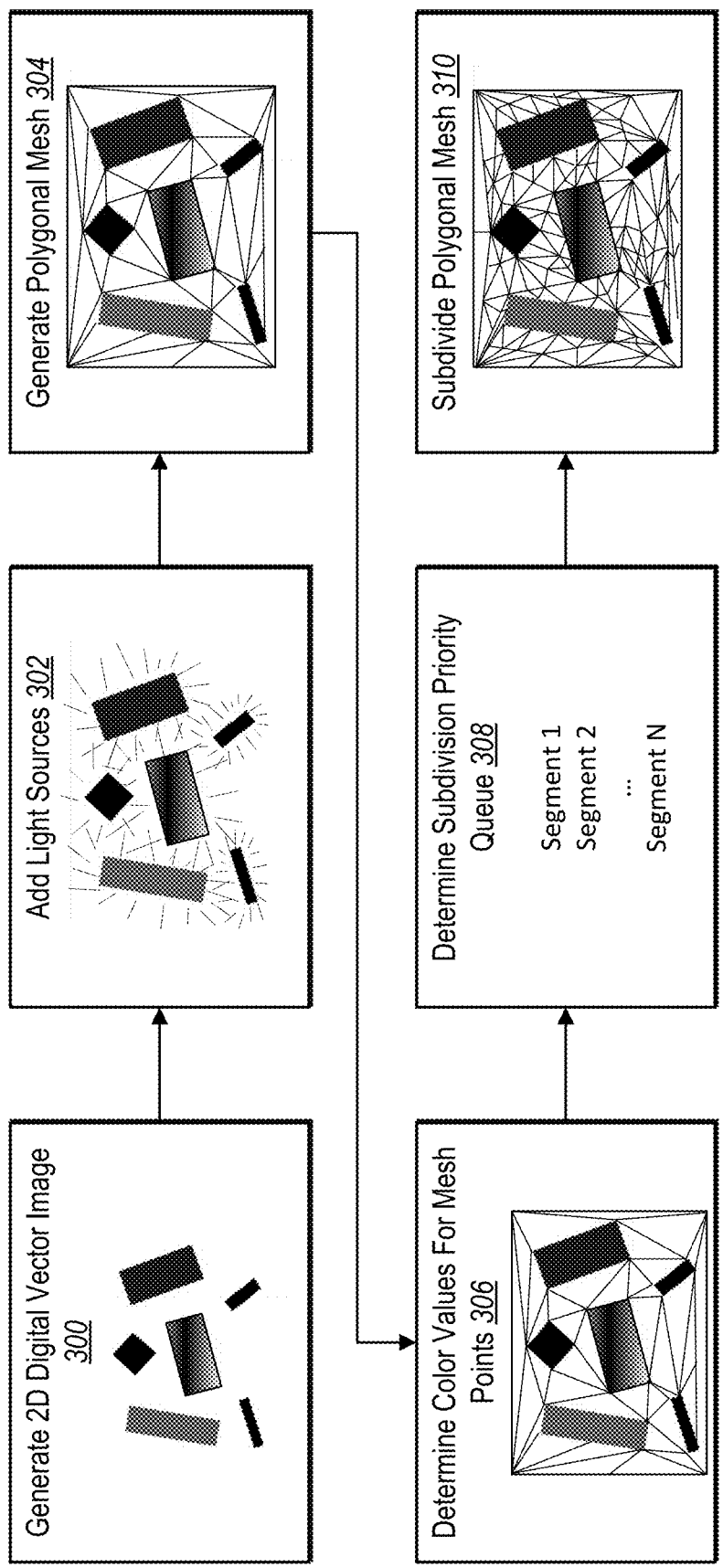
FIG. 3 illustrates a diagram of a process overview of utilizing a polygonal mesh with ray-tracing to illuminate a two-dimensional digital vector image in accordance with one or more implementations.

FIG. 3 illustrates an overview of a process of the vector image lighting system 102 illuminating a digital vector image using ray-tracing. Specifically, FIG. 3 illustrates a plurality of operations for illuminating a digital vector image via mesh generation and sampling a plurality of rays for assigning color values to mesh points in a polygonal mesh. Additionally, FIG. 3 illustrates operations for subdividing the polygonal mesh based on a subdivision priority according to error scores for segments in the polygonal mesh.

As illustrated in FIG. 3, the vector image lighting system 102 (or another system) performs an act 300 of generating a two-dimensional ("2D") digital vector image. In one or more embodiments, the vector image lighting system 102 generates a digital vector image in response to receiving one or more inputs (e.g., via a client device) to generate one or more vector elements. Specifically, the vector image lighting system 102 generates the vector element(s) by inserting a plurality of vertices into a two-dimensional space and connecting the vertices via one or more paths. In addition, the vector image lighting system 102 generates the vector elements to include one or more visual attributes (e.g., path colors, path thickness, shape fill color) that determine how the vector elements display on a display device.

After, or otherwise in connection with, generating the digital vector image and inserting one or more vector elements into the digital vector image, FIG. 3 illustrates that the vector image lighting system performs an act 302 of adding one or more light sources to the digital vector image. For instance, the vector image lighting system 102 adds light sources by selecting one or more vector elements in the digital vector image as one or more light sources. To illustrate, the vector image lighting system 102 determines whether vector elements act as light sources (e.g., have light source attributes) based on colors assigned to vector elements within a digital vector image. To illustrate, the vector image lighting system 102 determines that a vector element acts as a light source if a color value assigned to the vector element is different than a background color value for the digital vector image (e.g., if the background color value is black and the vector element has a color value other than black, the vector element is a light source).

Alternatively, the vector image lighting system 102 determines whether vector elements act as light sources based on explicit indications of light sources. For example, the vector image lighting system 102 determines that a given vector element is a light source in response to an input selecting the vector element as a light source in connection with a light source tool selector. In additional embodiments, the vector image lighting system 102 determines that vector elements are light sources in response to a painting/coloring tool that marks the vector elements with a light source color value. Thus, some vector elements with a given color (e.g., white) may be light sources, while other vector elements with the same color may not be light sources.

In some embodiments, the vector image lighting system 102 adds a light source to the digital vector image by assigning a set of light source attributes to a vector element or to a region of the digital vector image. To illustrate, the vector image lighting system 102 determines light source attributes including, but not limited to, size, color, intensity, distance/attenuation, or direction. The various light source attributes affect how the vector image lighting system 102 performs ray-tracing operations for each light source, thereby providing an ability to customize the effects of different light sources on the same point in the digital vector image.

In one or more embodiments, the vector image lighting system 102 determines the light source attributes for a light source based on attributes selected via a user input. For instance, the vector image lighting system 102 may provide tools for customizing light source attributes for each light source by setting specific values (or by using default values) for each light source attribute. In additional embodiments, the vector image lighting system 102 determines the light source attributes for a light source directly from the attributes of a vector element. To illustrate, the vector image lighting system 102 determines light source attributes for a vector element based on the size, position, direction(s), and color value(s)) of the vector element and components (e.g., individual paths and vertices) of the vector element.

In one or more embodiments, after adding one or more light sources to a digital vector image, the vector image lighting system uses ray-tracing to illuminate the digital vector image based on the light source(s). Specifically, as illustrated in FIG. 3, the vector image lighting system 102 performs an act 304 of generating a polygonal mesh within the digital vector image. For instance, the vector image lighting system 102 determines a region of the digital vector image that includes one or more light sources and/or one or more vector elements. In some embodiments, the region of the digital vector image includes all of the vector elements within the digital vector image. In alternative embodiments, the region of the digital vector image includes a subset of the vector elements within the digital vector image (e.g., based on an explicit selection by a user of the region or vector elements).

In response to determining the region of a digital vector image including one or more light sources and/or one or more vector elements, the vector image lighting system 102 also generates a bounding shape for the region of the digital vector image. In particular, as previously mentioned, the bounding shape provides an efficient way for the vector image lighting system 102 to determine whether sampled ray leave a scene without hitting any objects (e.g., vector elements) in the digital vector image. According to one or more embodiments, the bounding shape includes a rectangle that encloses the region of the digital vector image including the light source(s) and/or vector element(s). Alternatively, the bounding shape includes a different shape such as a circle, oval, or other shape.

In some embodiments, the vector image lighting system 102 automatically generates the bounding shape for the region of the digital vector image. For example, the vector image lighting system 102 generates the bounding shape based on boundaries of an image canvas, resolution, or other properties of the digital vector image. In other embodiments, the vector image lighting system 102 generates the bounding shape based on a user input drawing the bounding shape.

After enclosing a region of a digital vector image in a bounding shape, the vector image lighting system 102 generates the polygonal mesh while embedding existing vector elements into the polygonal mesh. For instance, the vector image lighting system 102 generates a triangular mesh that connects vertices of the existing vector elements to mesh points of generated triangles in the polygonal mesh. To illustrate, as previously mentioned, the vector image lighting system 102 generates a plurality of vertices that form a plurality of connected triangular faces within one or more open spaces of the digital vector image. The vector image lighting system 102 also connects the triangular faces to the vertices of the existing vector elements. In one or more embodiments, the vector image lighting system 102 generates a polygonal mesh utilizing Delaunay triangulation. As an example, processes for performing conforming Delaunay triangulation are described in U.S. Pat. No. 10,489,946 and in U.S. Pat. No. 10,242,464, which are herein incorporated by reference in their entirety. In additional examples, Delaunay triangulation based on Voronoi diagrams are described by Atsuyuki Okabe, Barry Boots, Kokichi Suihara, and Sung Nok Chiu in "Spatial tessellations: Concepts and applications of Voronoi diagrams, 2nd edition" (2000), which is herein incorporated by reference in its entirety. Alternatively, the vector image lighting system 102 utilizes a barycentric mesh generation process such as the process described by Julian Rimoli in "Barycentric subdivision meshes in computational solid mechanics" in *NSF Workshop on Barycentric Coordinates in Geometry Processing and Finite/Boundary Element Methods*" (2012), the entire contents of which are hereby incorporated by reference.

In alternative embodiments, the vector image lighting system 102 generates a quadrilateral mesh including quadrilateral faces. In some embodiments, the vector image lighting system 102 generates a mixed polygonal mesh including triangular faces and quadrilateral faces within one or more open spaces of the digital vector image. In additional embodiments, a vector image lighting system 102 provides an option to select a mesh type for a digital vector image. Accordingly, the vector image lighting system 102 generates a triangular mesh, a quadrilateral mesh, a mixed mesh, or other mesh type for a digital vector image based on the selected mesh type.

In one or more embodiments, the vector image lighting system 102 generates a polygonal mesh for a digital vector image according to a particular precision. Specifically, the vector image lighting system 102 determines one or more subdivision settings associated with the digital vector image. For example, the vector image lighting system 102 determines one or more thresholds based on number of subdivisions, segment lengths, error scores, or other parameters that affect the number and positioning of mesh points within a polygonal mesh.

In one or more additional embodiments, the vector image lighting system 102 modifies one or more vector elements in a digital vector image when generating a polygonal mesh. To illustrate, to embed the one or more vector elements into a polygonal mesh with one or more subdivisions, the vector image lighting system 102 modifies the one or more vector elements. For instance, to embed a vector element (e.g., an existing vector element or a bounding shape inserted into the digital vector image) into a polygonal mesh, the vector image lighting system 102 generates a plurality of vector segments that approximate the vector element. The vector image lighting system 102 then connects the vertices of the plurality of vector segments to the mesh points in the generated polygonal mesh. In one or more embodiments, in response to a modification to the polygonal mesh (e.g., in response to updated subdivision settings), the vector image lighting system 102 updates the polygonal mesh, generates a new approximation of the one or more vectors, and then embeds the new approximation into the updated polygonal mesh.

Furthermore, in connection with generating an approximation of a vector element within a digital vector image, the vector image lighting system 102 determines color values for the newly generated vector segments. In one or more embodiments, the vector image lighting system 102 determines color values for endpoints of the vector segments based on color values obtained from the original outline geometry of the vector element. To illustrate, the vector image lighting system 102 utilizes interpolation between two end points of an original vector segment to determine color values for new vertices inserted along the vector segment in the approximation. Thus, the vector image lighting system 102 determines color values for newly inserted vertices along vector segments corresponding to solid/constant colors or along vector segments corresponding to gradient colors.

According to one or more implementations, as illustrated in FIG. 3, the vector image lighting system 102 performs an act 306 of determining color values for mesh points in a polygonal mesh. In particular, the vector image lighting system 102 utilizes ray-tracing to sample a plurality of rays (e.g., directional paths) at a plurality of different points in the digital vector image. For example, the vector image lighting system 102 samples a plurality of rays at a plurality of locations corresponding to mesh points of the polygonal mesh within the digital vector image to determine whether the sampled rays intersect with vector elements or the bounding shape. In alternative embodiments, the vector image lighting system 102 samples rays at a plurality of randomly selected points within the region of the digital vector image including the polygonal mesh.

In response to determining that a sampled ray intersects with a vector element or the bounding shape, the vector image lighting system 102 determines a color value for a mesh point based on the intersection. Specifically, the vector image lighting system 102 determines an intersection color value based on a color value associated with the location of intersection of the sampled ray. For instance, the vector image lighting system 102 determines the intersection color value based on a color value associated with a segment including the intersection point. To illustrate, the color value associated with the segment is based on end points of the segment (e.g., by interpolating the intersection color value from the end points of the segment). Accordingly, the vector image lighting system 102 determines the intersection color value based on a segment of a vector element or based on a color value of the bounding shape surrounding the polygonal mesh. In some embodiments, the vector image lighting system 102 quickly and efficiently determines the intersection color value for sampled rays intersecting with the bounding shape without interpolation if the bounding shape has a single color value (e.g., a background color value).

According to one or more embodiments, the vector image lighting system 102 assigns a color value for the bounding shape of black to indicate no light. In alternative embodiments, the vector image lighting system 102 assigns a different color value to the bounding shape. For example, the vector image lighting system 102 assigns a non-black color to a plurality of vertices and/or segments in the bounding shape to indicate a global background illumination. In additional embodiments, the vector image lighting system 102 assigns a plurality of colors to the bounding shape (e.g., to different portions of the bounding shape) to indicate global directional lighting or other effects.

In one or more embodiments, the vector image lighting system 102 determines the color values for the mesh points in the polygonal mesh based on the intersection color values. In particular, the vector image lighting system 102 utilizes interpolation to determine a contribution to a color value for the sampled point based on a distance of the sampled point from the intersection. Additionally, in one or more embodiments, the vector image lighting system 102 determines a final color value for the sampled point by combining the color values for all of the sampled rays at the sampled point. Accordingly, if the sampled point corresponds directly to a mesh point (e.g., the sampled point is located at the mesh point), the final color value of the mesh point is the combination of color values for all sampled rays at the mesh point. Alternatively, the vector image lighting system 102 determines the color value of a mesh point based on one or more sampled points near the mesh point (e.g., by combining the color values of the one or more sampled points near the mesh point using interpolation).

In additional embodiments, the vector image lighting system 102 also utilizes reflection and refraction to determine more complex illumination of a digital vector image. For instance, the vector image lighting system 102 determines secondary rays for each sampled ray based on reflected or refracted rays from one or more intersections of the primary sampled rays. The vector image lighting system 102 utilizes the reflected or refracted rays to determine secondary intersections and then utilize the reflected/refracted intersection information to further determine the color values of mesh points.

In one or more embodiments, the vector image lighting system 102 determines intersections of sampled rays with curved paths (e.g., Bezier curves) without approximating the geometry of the curved paths. Instead, the vector image lighting system 102 performs ray intersection tests for sampled rays directly on the curved paths by finding corresponding roots of the curved polynomial (e.g., based on whether the Bezier curve is cubic or quadratic) according to a closed-form solution. The vector image lighting system 102 is thus able to determine positions (and color values) of intersections more quickly with the curved paths without first approximating the curved paths using straight line segments.

According to one or more embodiments, as illustrated in FIG. 3, the vector image lighting system 102 also performs an act 308 of determining a subdivision priority queue for determining color values of mesh points during subdivision of the polygonal mesh. For instance, the vector image lighting system 102 determines color values for mesh points in the polygonal mesh at each stage of mesh subdivision. To illustrate, the vector image lighting system 102 determines color values for mesh points in an initial polygonal mesh. For each subsequent subdivision of the polygonal mesh, the vector image lighting system 102 utilizes a priority queue to subdivide the polygonal mesh determine color values for new mesh points added to the polygonal mesh.

In one or more embodiments, the vector image lighting system 102 generates the priority queue based on error scores associated with segments of the polygonal mesh. Specifically, the vector image lighting system 102 orders a plurality of segments of the polygonal mesh within the priority queue according to decreasing error score. For example, the vector image lighting system 102 determines the error scores associated with the segments of the polygonal mesh based on actual (e.g., measured/sampled) color values associated with midpoints of the segments and estimated color values associated with the midpoints of the segments. To illustrate, the vector image lighting system 102 determines a difference between a sampled color value of a midpoint of a segment and an estimated value associated with the midpoint is (or makes up a portion of) an error score for the segment. In additional embodiments, the vector image lighting system 102 determines error scores based on one or more thresholds associated with characteristics of the segments in the polygonal mesh.

Furthermore, according to one or more embodiments, the vector image lighting system 102 performs an act 310 of subdividing the polygonal mesh, as illustrated in FIG. 3. In particular, the vector image lighting system 102 utilizes the priority queue to determine how to subdivide the polygonal mesh. For instance, the vector image lighting system 102 accesses the priority queue and selects the top segment (e.g., the segment with the highest error score). The vector image lighting system 102 then subdivides the selected segment (e.g., splits the segment in two) and then assigns the midpoint of the two new segments a sampled color value.

In one or more embodiments, the vector image lighting system 102 then generates error scores for the new segments and inserts the new segments into the priority queue according to the error scores. To illustrate, the vector image lighting system 102 generates error scores for the new segments according to sampled color values and estimated color values for the midpoints of the new segments. The vector image lighting system 102 then continues subdividing the polygonal mesh by selecting the top segment in the updated priority queue. In some embodiments, the vector image lighting system 102 stops subdividing the polygonal mesh upon reaching one or more subdivision thresholds associated with the digital vector image.

Figure 4A:
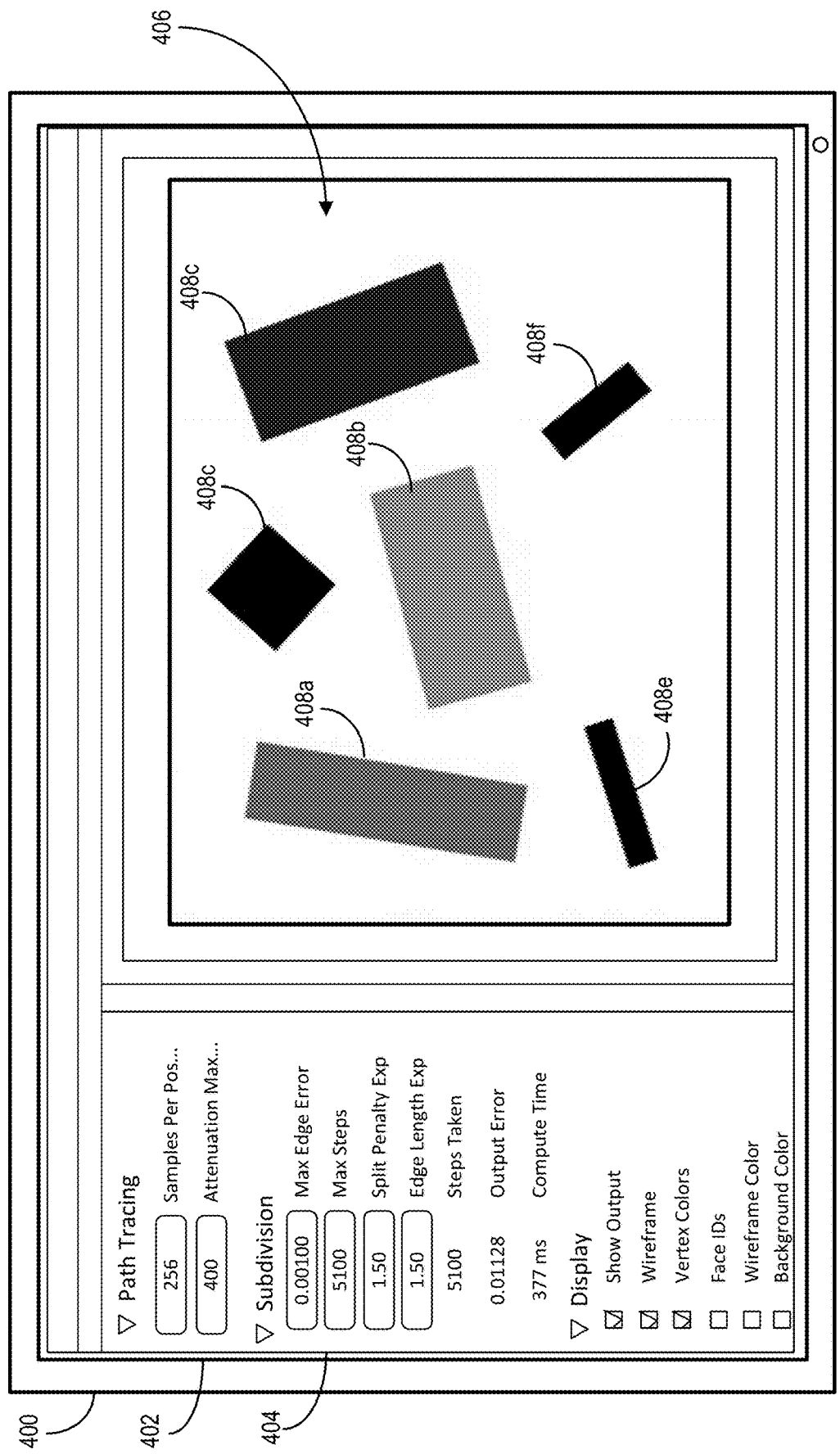
FIGS. 4A-4E illustrate graphical user interfaces for inserting light sources with ray-tracing illumination into a two-dimensional digital vector image in accordance with one or more implementations.
Figure 4B:
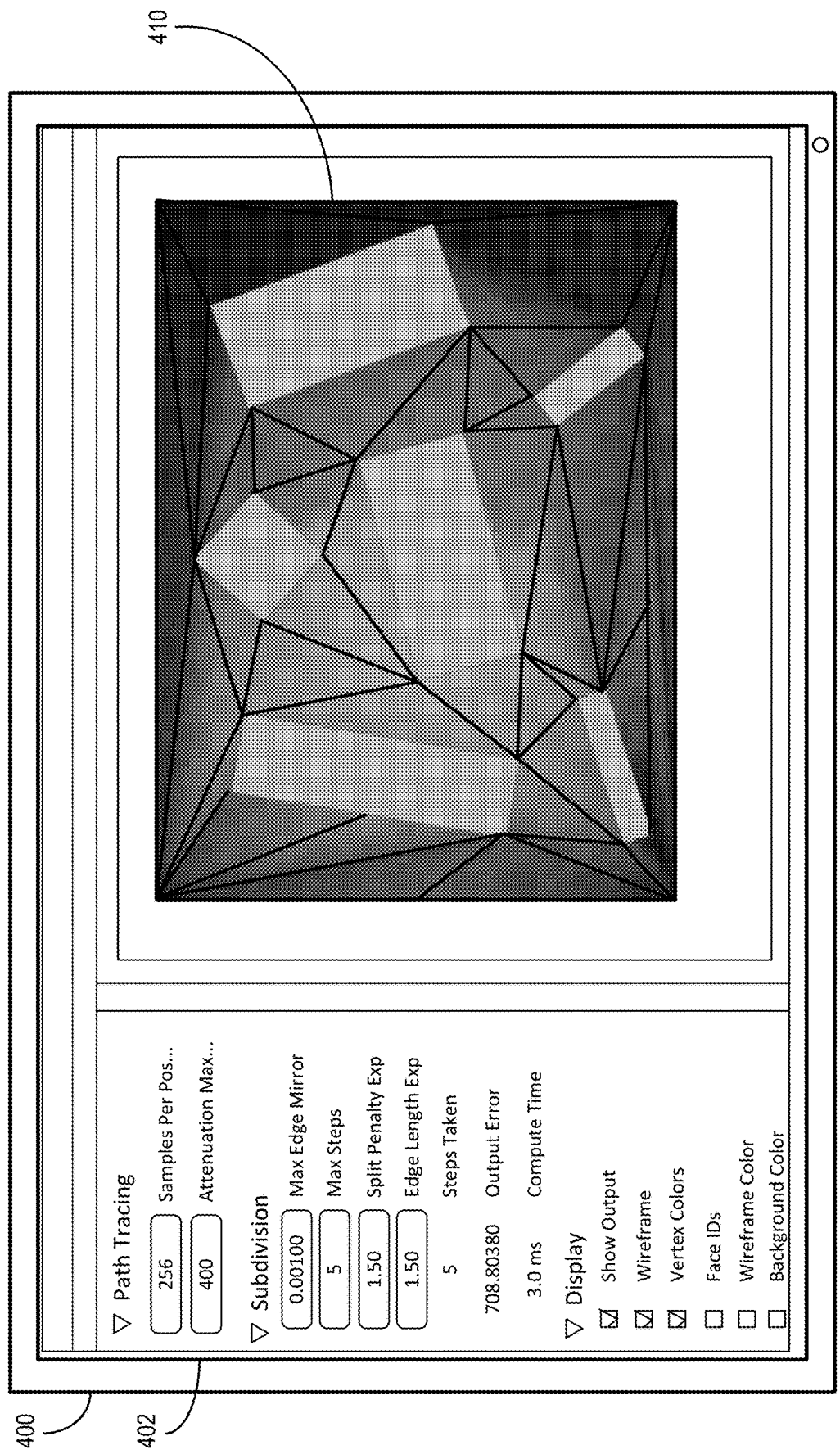
Figure 4C:
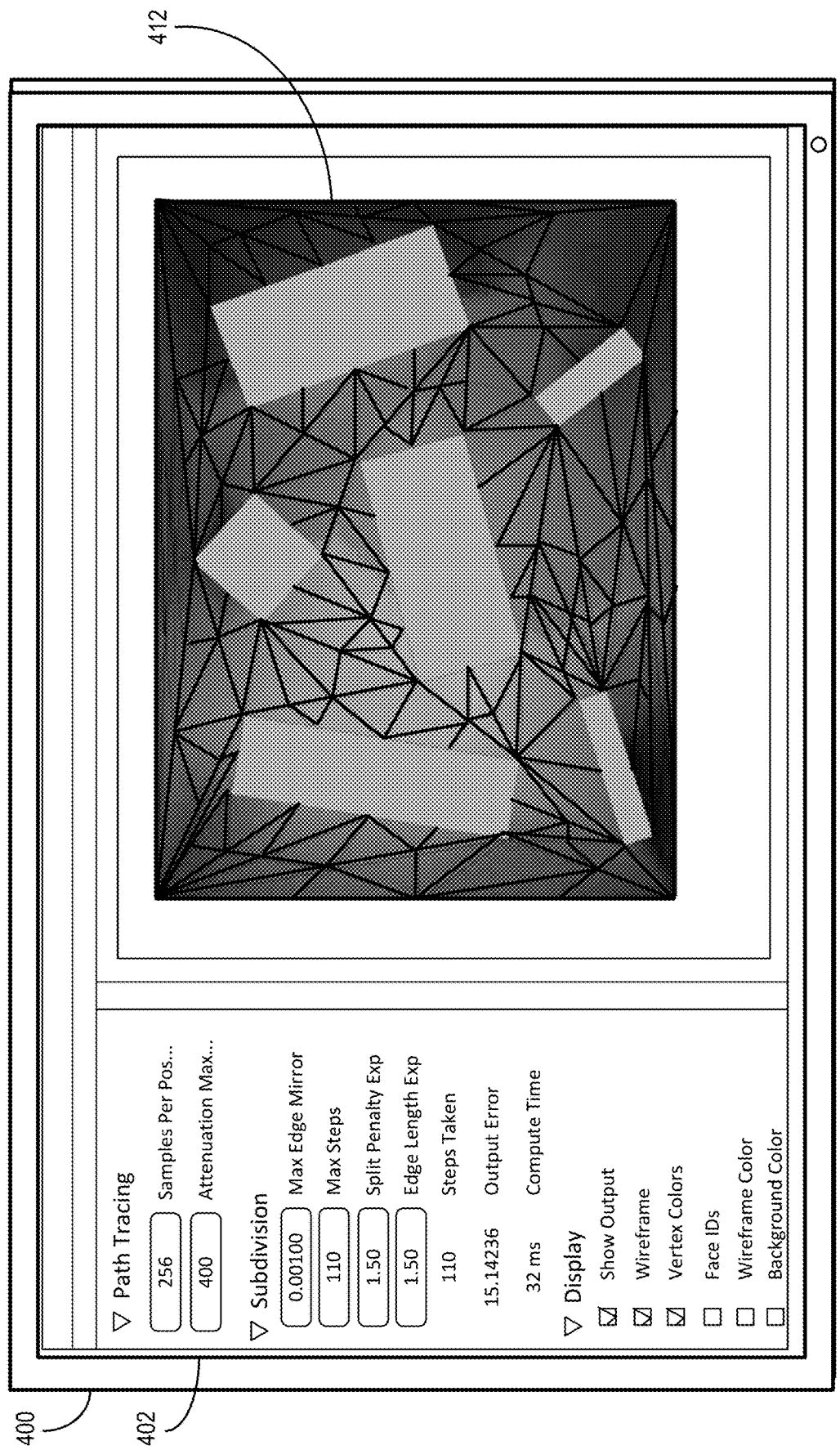
Figure 4D:
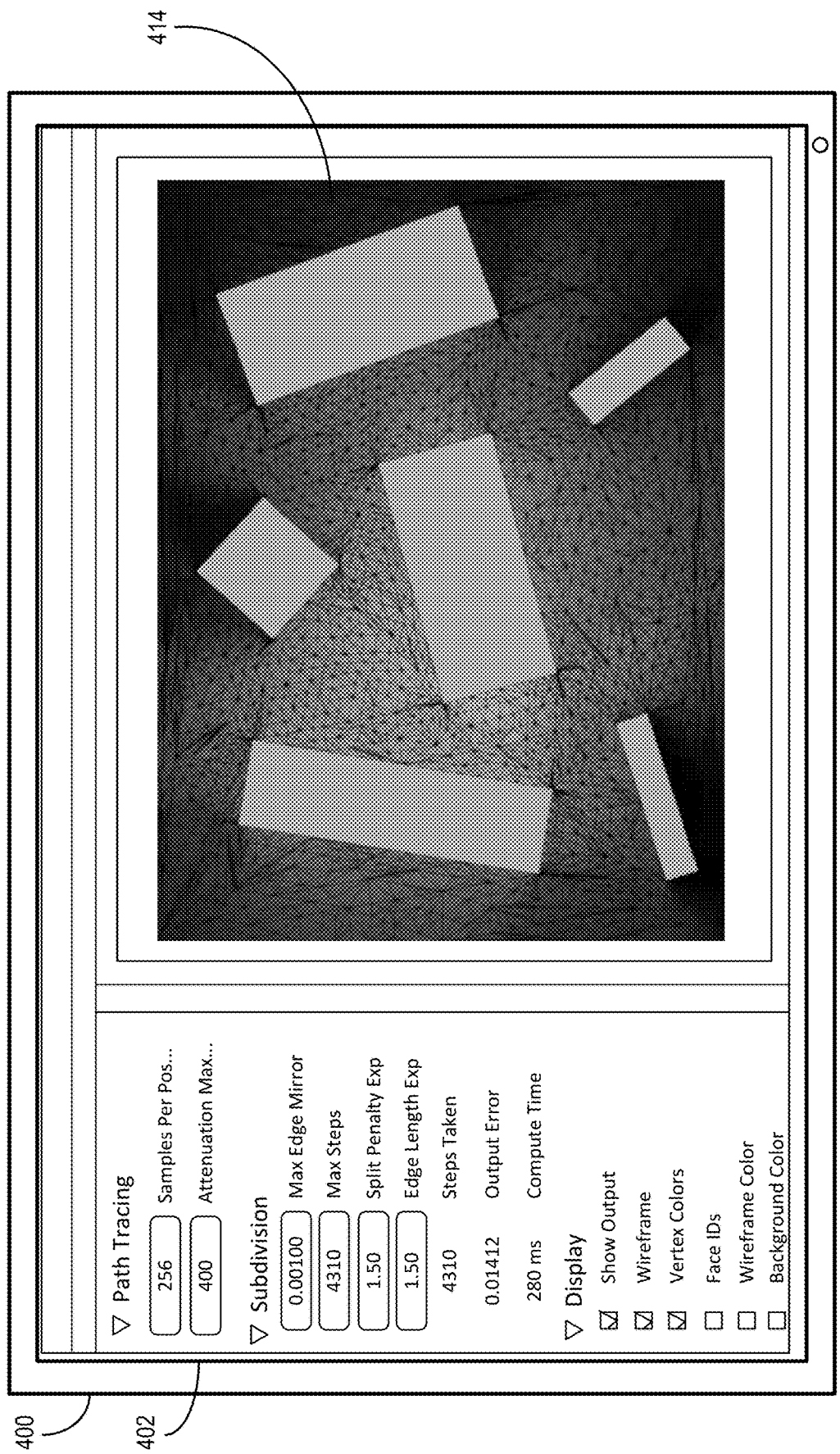
Figure 4E:
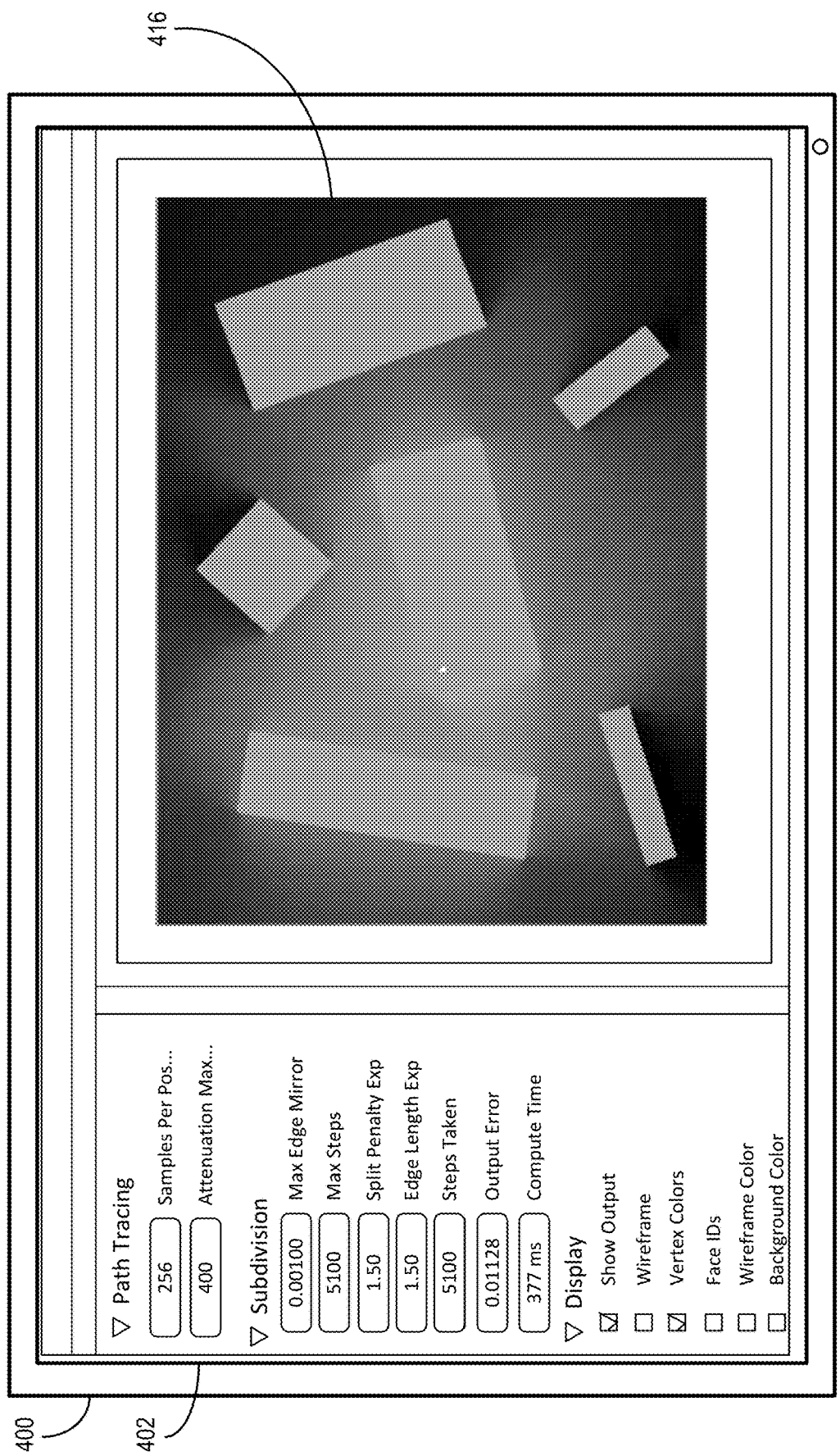

FIGS. 4A-4E illustrate graphical user interfaces for illuminating a digital vector image utilizing ray-tracing. Specifically, FIG. 4A illustrates a client device displaying a digital vector image including a plurality of vector elements prior to illuminating the digital vector image. FIGS. 4B-4D illustrate the client device displaying different illumination settings according to various stages of subdivision of a polygonal mesh. FIG. 4E illustrates the client device displaying a final digital vector image after illuminating the digital vector image utilizing a subdivided polygonal mesh.

As mentioned, FIG. 4A illustrates a graphical user interface of a client device 400 on which a digital image application 402 runs. For example, the digital image application 402 includes a digital image editing application for generating and/or editing digital vector images. In some embodiments, the digital image application 402 provides a set of tools for illuminating digital vector images after generating the digital vector images in the digital image application 402 or in another application. As illustrated in FIG. 4A, for example, the client device 400 displays a toolbar 404 including various tools for illuminating a digital vector image 406 including a plurality of vector elements 408a-408f.

In one or more embodiments, the client device 400 receives one or more inputs indicating one or more light sources in the digital vector image 406. Specifically, the vector image lighting system 102 receives one or more selections of one or more existing vector elements within the digital vector image 406. To illustrate, the vector image lighting system 102 receives selections of a first vector element 408a and a second vector element 408b as light sources. In alternative embodiments, the vector image lighting system 102 determines one or more light sources based on attributes of one or more vector elements, such as based on color values assigned to the vector element(s), position of the vector element(s), or metadata for the digital vector image (e.g., based on one or more tools used to generate a vector element).

In additional embodiments, the vector image lighting system 102 provides tools for inserting global directional lights or lights unconnected to existing vector elements. For instance, the vector image lighting system 102 inserts a global directional light by inserting a new vector element (e.g., a line) along one or more edges of the bounding shape or by assigning light source attributes to one or more edges (or a portion of an edge) of the bounding shape. In additional embodiments, the vector image lighting system 102 inserts a light source as a hidden (or partially transparent) vector element (e.g., an object with no visible boundary) into a digital vector element. In alternative embodiments, the vector image lighting system 102 assigns light source attributes to mesh points in a polygonal mesh generated for a digital vector image (e.g., in a semi-transparent mesh) to illuminate based on light emitters without directly accumulating color values due to intersections with objects. By providing varied light source options, the vector image lighting system 102 also provides options for simulating complex lighting environments such as cast shadows due to global lighting or subtle lighting effects. In particular, the vector image lighting system 102 generates a semi-transparent mesh that captures cast shadows by using the path tracing to determine the visibility of light emitters rather than directly accumulating the color.

In response to, or otherwise in connection with, determining one or more light sources for the digital vector image 406, the vector image lighting system 102 utilizes raytracing with polygonal mesh generation to illuminate the digital vector image 406 according to illumination settings. For instance, the client device 400 displays a set of tools within the toolbar 404 for establishing illumination settings. In additional embodiments, the client device 400 displays a set of tools within the toolbar 404 for establishing subdivision settings. The vector image lighting system 102 utilizes the illumination settings to illuminate the digital vector image 406 according to light sources and other vector elements within the digital vector image 406.

In some embodiments, the illumination settings include settings for determining light source attributes corresponding to the light sources in the digital vector image 406. To illustrate, the illumination settings include a number of rays to sample per sampling point within the digital vector image 406. Additionally, as illustrated in FIG. 4A, the toolbar 404 includes an attenuation option for illuminating the digital vector image 406 according to a maximum attenuation for one or more of the light sources. For instance, the attenuation option indicates how far light from one or more light sources travels due to a reduction of intensity of the light source in space.

In one or more embodiments, the illumination settings include additional illumination settings for the digital vector image 406 such as environment settings, background lighting settings, or other settings that affect the illumination effects from one or more light sources in the digital vector image 406. In various embodiments, the vector image lighting system 102 provides options to apply illumination settings to individual light sources. In additional embodiments, the vector image lighting system 102 provides options to apply illumination settings to all light sources in a digital vector image.

In addition to the illumination settings, the vector image lighting system 102 also determines subdivision settings for determining how to subdivide a polygonal mesh. In one or more embodiments, the vector image lighting system 102 determines a number of subdivisions to perform based on a subdivision threshold. Additionally, the vector image lighting system 102 determines one or more threshold values associated with determining error scores such as an error threshold, a segment split threshold, and/or a segment length threshold. The vector image lighting system 102 thus dynamically determines a number of times to subdivide a polygonal mesh as a whole, as well as a number of times and amounts to subdivide individual segments within the polygonal mesh. Additionally, the subdivision settings allow the vector image lighting system 102 to determine how to generate a priority queue during mesh subdivision and a stopping point for the subdivision steps. In some embodiments, the subdivision settings also include a budget for computing resources and/or time.

Once the vector image lighting system 102 has determined illumination settings and subdivision settings for illuminating a digital vector image, the vector image lighting system 102 generates a polygonal mesh and performs raytracing to illuminate the digital vector image. As mentioned, FIGS. 4B-4D illustrate a plurality of different illumination settings and subdivision settings for the digital vector image 406 of FIG. 4A. In particular, FIG. 4B illustrates a first modified digital vector image 410 based on a first set of illumination settings and subdivision settings. FIG. 4C illustrates a second modified digital vector image 412 based on a second set of illumination settings and subdivision settings. FIG. 4D illustrates a third modified digital vector image 414 based on a third set of illumination settings and subdivision settings. As illustrated, the vector image lighting system 102 is able to generate illuminated digital vector images with low fidelity (e.g., low-resolution polygonal meshes) and high fidelity (e.g., high-resolution polygonal meshes).

In one or more additional embodiments, the vector image lighting system 102 provides an option to view a wireframe of a polygonal mesh generated for a particular set of illumination settings and subdivision settings. Specifically, FIGS. 4B-4D illustrate a plurality of embodiments of modified digital images in which the client device 400 displays wireframes of the polygonal meshes generated according to the plurality of different sets of illumination settings and subdivision settings. By displaying the wireframe of a polygonal mesh, the client device 400 provides users with an understanding of how the vector image lighting system 102 generated and subdivided the polygonal mesh. Additionally, in some embodiments, the vector image lighting system 102 further provides an option to hide the wireframe of a polygonal mesh to view a final rendering of the illuminated digital vector image. For example, FIG. 4E illustrates a final modified digital vector image 416 according to the third set of illumination settings and subdivision settings without displaying a wireframe of the polygonal mesh (e.g., the polygonal mesh of FIG. 4D).

According to one or more embodiments, the vector image lighting system 102 also provides one or more options for selectively subdividing portions of a polygonal mesh. For instance, the vector image lighting system 102 subdivides a portion of a polygonal mesh in a portion of an illuminated digital vector image in response to a selection of the portion via the digital image application 402. To illustrate, in response to providing a wireframe view of the polygonal mesh of a modified digital vector image, the user may desire to improve the illumination detail in a specific portion of the digital vector image, and the client device 400 selects the portion of the polygonal mesh in response to an input by the user. In additional embodiments, the vector image lighting system 102 further subdivides a corresponding portion of the polygonal mesh in the portion of the digital vector image in response to receiving an input to zoom in on the portion of the digital vector image.

The vector image lighting system 102 thus subdivides the portion of the polygonal mesh in a selected portion of a digital vector image without subdividing portions of the polygonal mesh outside the selected portion of the digital vector image. For example, the vector image lighting system 102 further subdivides the polygonal mesh in the selected portion and assigns color values to new vertices in the polygonal mesh. By increasing the number of vertices in one or more specific portions of a polygonal mesh, the vector image lighting system 102 provides additional detail for areas of an illuminated digital vector image that may have illumination errors at lower vertex counts without increasing the number of vertices (e.g., via wholesale subdivision steps) across the entire polygonal mesh.

Figure 5B:
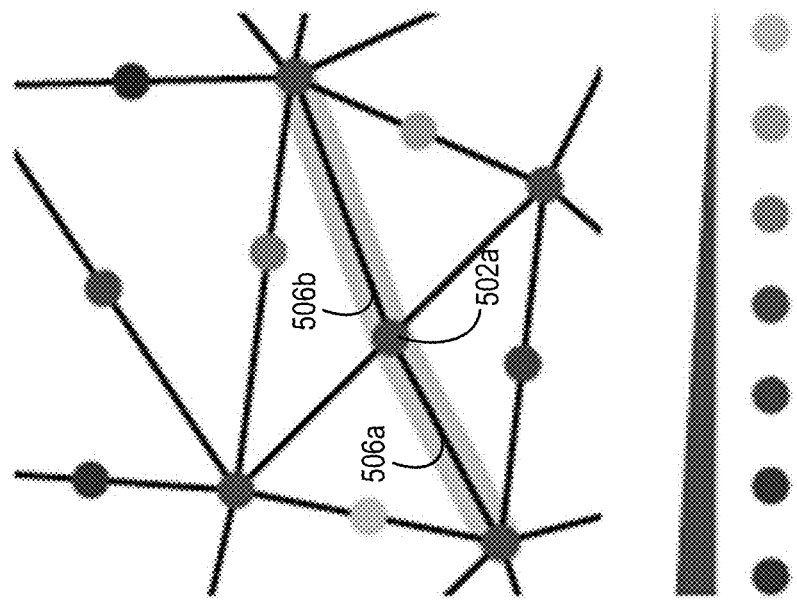
FIGS. 5A-5C illustrate diagrams for determining color values for mesh points while subdividing a polygonal mesh in a two-dimensional digital vector image in accordance with one or more implementations.
Figure 5A:
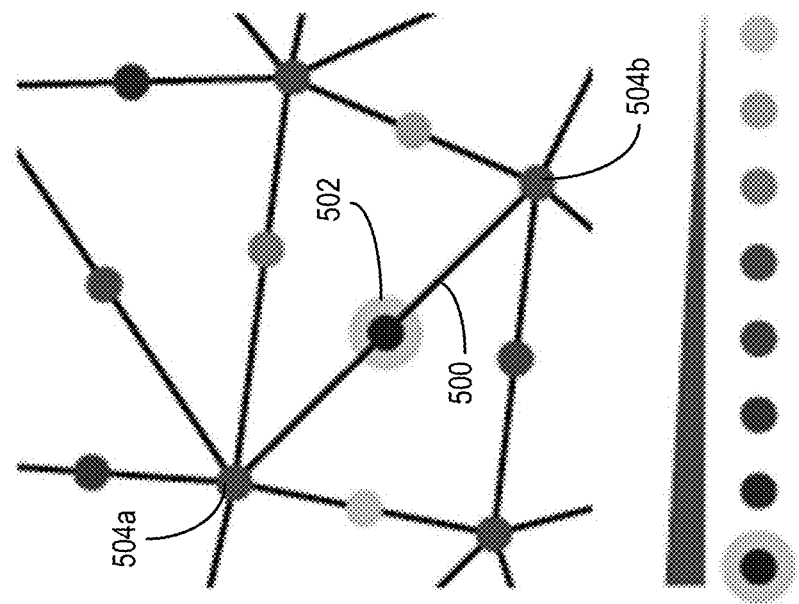
Figure 5C:
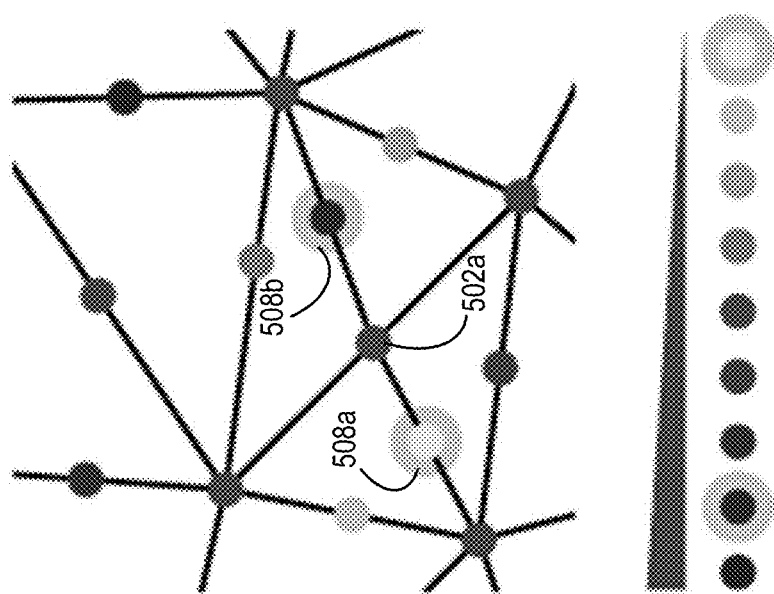

As previously mentioned, in one or more embodiments, the vector image lighting system 102 determines a priority queue for subdividing a polygonal mesh. For instance, the vector image lighting system 102 organizes segments of the polygonal mesh in the priority queue according to error scores determined for the segments. FIGS. 5A-5C illustrate embodiments of the vector image lighting system 102 subdividing a segment 500 of a polygonal mesh based on an error score associated with a midpoint 502 of the segment 500. Specifically, the vector image lighting system 102 determines an error score associated with the midpoint 502 and places the segment 500 in the priority queue according to the error score.

In one or more embodiments, the vector image lighting system 102 determines an error score associated with the segment 500 of the polygonal mesh based on a sampled color value of the midpoint 502 of the segment 500 and an estimated color value of the midpoint 502, as illustrated in FIG. 5A. For instance, the vector image lighting system 102 utilizes the sampling process described above to determine the sampled color value of the midpoint 502 (e.g., by sampling a plurality of rays from the midpoint 502). The vector image lighting system 102 also determines the estimated color value of the midpoint 502 by interpolating the color values of end points 504a-504b of the segment 500. Accordingly, the vector image lighting system 102 determines the error score based on a difference between the sampled color value and the estimated color value.

According to one or more embodiments, the vector image lighting system 102 places segments of the polygonal mesh in the priority queue according to the error scores. For example, the vector image lighting system 102 inserts each segment of the polygonal mesh into the priority queue according to decreasing error score, such that the priority queue includes segments with the highest error scores at the top of the priority queue. Thus, the vector image lighting system 102 inserts the segment 500 into the priority queue according to the error score of the segment 500 relative to error scores of other segments in the polygonal mesh.

In one or more embodiments, the vector image lighting system 102 also utilizes one or more thresholds related to the length of each segment or number of subdivisions applied to a particular segment to generate the error score for determining a position of a segment in the priority queue. For instance, the vector image lighting system 102 penalizes subdivision of segments based on the segment lengths. Additionally, in some embodiments, the vector image lighting system 102 penalizes segments that the vector image lighting system 102 has previously segmented based on the number of previous subdivisions. In one or more embodiments, the vector image lighting system 102 generates the error score for a segment as $E=(c_s-c_i)^2 \times n^{-\lambda_s} \times |e|^{\lambda_e}$, in which $c_s$ represents the sampled color value, $c_i$ represents the estimated (interpolated) color value, n represents the number of subdivisions already performed on a segment, $|e|$ represents the length of the segment, and $\lambda_s$ and $\lambda_e$ represent the subdivision count and segment length penalization terms, respectively.

In some embodiments, the segment length penalization term is based on an absolute segment length. In alternative embodiments, the segment length penalization term is based on a relative segment length. Accordingly, the vector image lighting system 102 penalizes subdivision of segments that have a specific segment length or a segment length ratio relative to one or more other segments in a polygonal mesh.

In one or more embodiments, after the vector image lighting system 102 has generated an error score for the segment 500 and place the segment 500 into the corresponding position of the priority queue, the vector image lighting system 102 subdivides the segment 500 when the segment 500 reaches the top of the priority queue. Specifically, the vector image lighting system 102 selects the segment 500 from the top of the priority queue and subdivides the segment 500 into a plurality of new segments (a first new segment 506a and a second new segment 506b). Each of the new segments is connected by the midpoint 502a, which represents a common endpoint for each of the new segments, as illustrated in FIG. 5B.

In one or more embodiments, after subdividing the segment 500 to generate the new segments, the vector image lighting system 102 places each of the new segments into the priority queue. Specifically, the vector image lighting system 102 determines error scores associated with the new segments and inserts the new segments into the priority queue based on the error scores. FIG. 5C illustrates that the vector image lighting system 102 determines midpoints of the new segments (e.g., a first new midpoint 508a of the first new segment 506a and a second new midpoint 508b of the second new segment 506b) and then determines the corresponding error scores based on the corresponding midpoints. For instance, the vector image lighting system 102 determines an error score for the first new segment 506a based on an error score associated with the first new midpoint 508a and an error score for the second new segment 506b based on an error score associated with the second new midpoint 508b. The vector image lighting system 102 places the new segments into the priority queue and then subdivides the new segments once the new segments, individually, reach the top of the priority queue.

In some embodiments, the vector image lighting system 102 also determines a threshold error score associated with the priority queue. In particular, the vector image lighting system 102 establishes the threshold error score such that the vector image lighting system 102 does not subdivide segments that do not meet the threshold error score (e.g., segments that have error scores below the threshold error score). Additionally, in some embodiments, the vector image lighting system 102 does not insert segments that do not meet the threshold error score into the priority queue. In further embodiments, the vector image lighting system 102 establishes a maximum number of subdivision steps such that the vector image lighting system 102 stops subdividing segments in a polygonal mesh upon reaching the maximum number of subdivision steps, even if additional segments remain in the priority queue.

Although FIGS. 5A-5C illustrate that the vector image lighting system 102 subdivides a single segment at a time according to a priority queue, in one or more alternative embodiments, the vector image lighting system 102 subdivides a plurality of segments together. For instance, the vector image lighting system 102 subdivides a plurality of edges of a single polygon (e.g., a single triangle) together to provide a uniform triangulation/subdivision. This creates a plurality of additional faces and vertices simultaneously. The vector image lighting system 102 then tests the new segments (e.g., based on new midpoints) and inserts the new segments into the priority queue.

Figure 6:
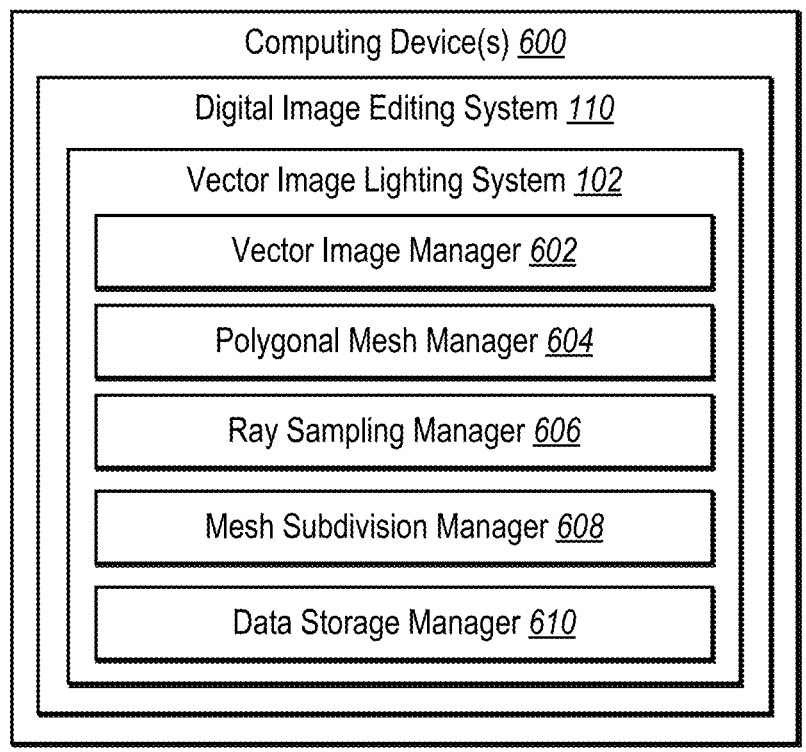
FIG. 6 a diagram of the vector image lighting system of FIG. 1 in accordance with one or more implementations.

FIG. 6 illustrates a detailed schematic diagram of an embodiment of the vector image lighting system 102 described above. As shown, the vector image lighting system 102 is implemented in a digital image editing system 110 on computing device(s) 600 (e.g., a client device and/or server device as described in FIG. 1, and as further described below in relation to FIG. 8). Additionally, the vector image lighting system 102 includes, but is not limited to, a vector image manager 602, a polygonal mesh manager 604, a ray sampling manager 606, a mesh subdivision manager 608, and a data storage manager 610. The vector image lighting system 102 can be implemented on any number of computing devices. For example, the vector image lighting system 102 can be implemented in a distributed system of server devices for illuminating digital vector images using ray-tracing. The vector image lighting system 102 can also be implemented within one or more additional systems. Alternatively, the vector image lighting system 102 can be implemented on a single computing device such as a single client device.

In one or more embodiments, each of the components of the vector image lighting system 102 is in communication with other components using any suitable communication technologies. Additionally, the components of the vector image lighting system 102 are capable of being in communication with one or more other devices including other computing devices of a user, server devices (e.g., cloud storage devices), licensing servers, or other devices/systems. It will be recognized that although the components of the vector image lighting system 102 are shown to be separate in FIG. 6, any of the subcomponents may be combined into fewer components, such as into a single component, or divided into more components as may serve a particular implementation. Furthermore, although the components of FIG. 6 are described in connection with the vector image lighting system 102, at least some of the components for performing operations in conjunction with the vector image lighting system 102 described herein may be implemented on other devices within the environment.

In some embodiments, the components of the vector image lighting system 102 include software, hardware, or both. For example, the components of the vector image lighting system 102 include one or more instructions stored on a computer-readable storage medium and executable by processors of one or more computing devices (e.g., the computing device(s) 600). When executed by the one or more processors, the computer-executable instructions of the vector image lighting system 102 cause the computing device(s) 600 to perform the operations described herein. Alternatively, the components of the vector image lighting system 102 can include hardware, such as a special purpose processing device to perform a certain function or group of functions. Additionally, or alternatively, the components of the vector image lighting system 102 can include a combination of computer-executable instructions and hardware.

Furthermore, the components of the vector image lighting system 102 performing the functions described herein with respect to the vector image lighting system 102 may, for example, be implemented as part of a stand-alone application, as a module of an application, as a plug-in for applications, as a library function or functions that may be called by other applications, and/or as a cloud-computing model. Thus, the components of the vector image lighting system 102 may be implemented as part of a stand-alone application on a personal computing device or a mobile device. Alternatively, or additionally, the components of the vector image lighting system 102 may be implemented in any application that provides digital image modification, including, but not limited to ADOBE® CREATIVE CLOUD®, ADOBE® FRESCO®, ADOBE® AFTER EFFECTS®, or ILLUSTRATOR® software. "ADOBE," "CREATIVE CLOUD," "ADOBE FRESCO," "AFTER EFFECTS," and "ILLUSTRATOR" are either registered trademarks or trademarks of Adobe Inc. in the United States and/or other countries.

The vector image lighting system 102 includes a vector image manager 602 to manage two-dimensional digital vector images. For example, the vector image manager 602 manages contents of digital vector images including generating, editing, or determining information associated with vector elements of digital vector images. The vector image manager 602 also manages metadata associated with digital vector images including managing attributes of vector elements in the digital vector images.

In one or more embodiments, the polygonal mesh manager 604 manages the creation of polygonal meshes in digital vector images. For example, the polygonal mesh manager 604 generates triangular meshes or quadrilateral meshes in digital vector images in response to requests to illuminate the digital vector images. In some embodiments, the polygonal mesh manager 604 also embeds existing vector elements into polygonal meshes in connection with illuminating digital vector images. The polygonal mesh manager 604 also generates a bounding shape for generating a polygonal mesh within a portion of a digital vector image.

In one or more embodiments, the ray sampling manager 606 samples rays at a plurality of points in digital vector images during a ray-tracing process for illuminating digital vector images. To illustrate, the ray sampling manager 606 samples a plurality of rays to determine intersection of the rays with vector elements and/or bounding shapes. In some embodiments, the ray sampling manager 606 also determines color values associated with mesh points in a polygonal mesh based on the intersections of the sampled rays with the vector elements and/or bounding shapes.

According to one or more embodiments, the mesh subdivision manager 608 manages the subdivision of polygonal meshes. Specifically, the mesh subdivision manager 608 determines subdivision settings for subdividing a polygonal mesh. Additionally, the mesh subdivision manager 608 generates and utilizes a priority queue for determining how to subdivide a polygonal mesh. For instance, the vector image lighting system 102 generates error scores for segments in a polygonal mesh and then utilizes the error scores to insert the segments into a priority queue for subdividing the polygonal mesh.

The vector image lighting system 102 also includes a data storage manager 610 (that comprises a non-transitory computer memory/one or more memory devices) that stores and maintains data associated with illuminating digital vector images. For example, the data storage manager 610 stores data associated with inserting light sources into digital vector images, generating polygonal meshes, subdividing polygonal meshes, and assigning color values to mesh points in the polygonal meshes. To illustrate, the data storage manager 610 stores mesh points in a polygonal mesh of a digital vector image, color values of the mesh points, error scores for segments of the polygonal mesh, and a priority queue for subdividing the polygonal mesh.

Figure 7:
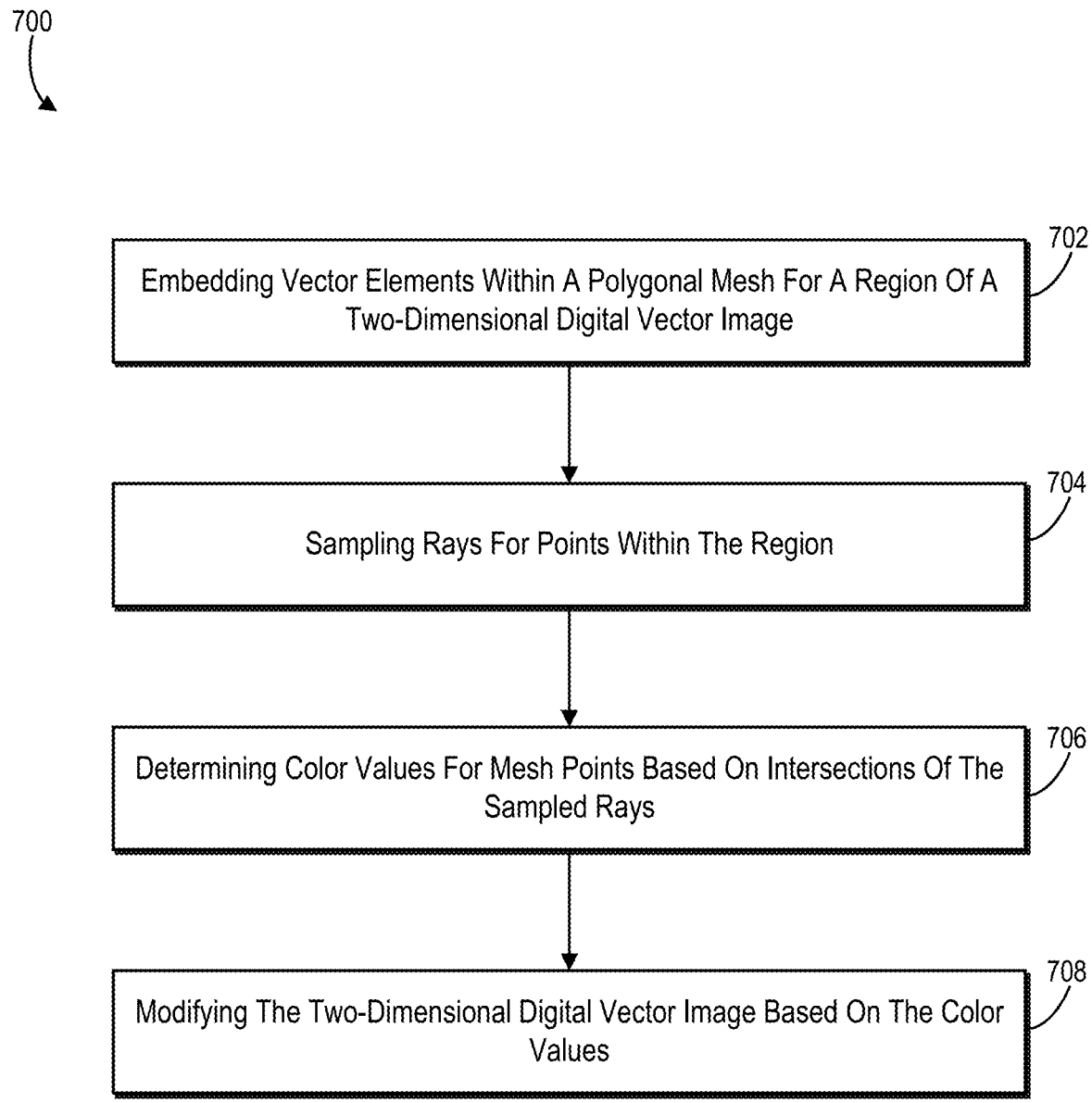
FIG. 7 illustrates a flowchart of a series of acts for generating an illuminated two-dimensional digital vector image using ray-tracing and a polygonal mesh in accordance with one or more implementations.

Turning now to FIG. 7, this figure shows a flowchart of a series of acts 700 of generating an illuminated two-dimensional digital vector image using ray-tracing. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

As shown, the series of acts 700 includes an act 702 of embedding vector elements within a polygonal mesh for a region of a two-dimensional digital vector image. For example, act 702 involves embedding, in response to inserting one or more light sources into a two-dimensional digital vector image, one or more vector elements of the two-dimensional digital vector image within a polygonal mesh generated for a region of the two-dimensional digital vector image. Act 702 involves generating a triangular mesh comprising a plurality of vertices including vertices of the one or more vector elements based on a subdivision setting for the two-dimensional digital vector image.

Act 702 involves generating the bounding shape as a vector rectangle element enclosing the region in response to inserting the one or more light sources into the two-dimensional digital vector image. For example, act 702 involves generating, in response to a request to insert one or more light sources into the two-dimensional digital vector image, a bounding shape for a region comprising one or more vector elements of the two-dimensional digital vector image. Act 702 can also involve assigning a background color value to the vector rectangle element.

Act 702 involves assigning a light source to a vector element of the two-dimensional digital vector image. Act 702 involves inserting a global directional light source. In one or more embodiments, act 702 involves inserting a light source at a specific location within the two-dimensional digital vector image.

Act 702 can also involve embedding the one or more vector elements within a polygonal mesh generated within the bounding shape by connecting the one or more vector elements to the polygonal mesh. For example, act 702 involves generating one or more approximations of the one or more vector elements and connecting vertices of the one or more approximations to mesh points in the polygonal mesh.

Alternatively, act 702 involves determining vertices of the one or more vector elements. Act 702 involves determining a subdivision threshold corresponding to the two-dimensional digital vector image. Act 702 can also involve generating, according to the subdivision threshold, the polygonal mesh comprising the vertices of the one or more vector elements and additional vertices corresponding to a plurality of additional mesh polygons within the region generated.

The series of acts 700 includes an act 704 of sampling rays for points within the region. For example, act 704 involves sampling, based on the one or more light sources in the two-dimensional digital vector image, a plurality of rays for a plurality of points within the region.

Act 704 involves sampling a first ray in a first direction and a second ray in a second direction from a point within the region. Act 704 can also involve determining a first intersection of the first ray with a vector element of the one or more vector elements. Act 704 can further involve determining a second intersection of the second ray with a second vector of the bounding shape.

Additionally, the series of acts 700 includes an act 706 of determining color values for mesh points based on intersections of the sampled rays. For example, act 706 involves determining color values for mesh points in the polygonal mesh based on intersections of the plurality of rays with the one or more vector elements or a bounding shape enclosing the region. Act 706 involves determining an intersection color value corresponding to an intersection of a ray at a particular point of the plurality of points within the region. Additionally, act 706 involves determining a color value for the particular point based on the intersection color value by interpolating from the intersection color value.

Act 706 can also involve determining initial color values for the mesh points in the polygonal mesh. For example, act 706 involves generating an initial polygonal mesh comprising a first set of segments. Act 706 can then involve determining first color values for a first set of mesh points in the first set of segments, and determining a priority queue for subdividing the initial polygonal mesh based on error score corresponding to the first set of segments.

Act 706 can then involve generating a priority queue comprising segments of the polygonal mesh based on error scores associated with the segments for subdividing the initial polygon mesh. Act 706 can also involve determining an error score of a particular segment in a top position of the priority queue by determining a sampled color value for a midpoint of the particular segment in the polygonal mesh by sampling a plurality of rays from a midpoint of the segment to an intersection with the one or more vector elements or the bounding shape. Act 706 can also involve determining an estimated color value for the midpoint by interpolating end point color values corresponding to end points of the particular segment. Act 706 can then involve generating an error score for the particular segment based on a difference between the sampled color value and the estimated color value. Act 706 can then involve ranking segments of the polygonal mesh within the priority queue according to the error scores.

Act 706 can also involve generating a subdivided polygonal mesh comprising a second set of segments based on the priority queue. Act 706 can then involve determining second color values for a second set of mesh points in the second set of segments. For example, act 706 can also involve subdividing the particular segment into subdivided segments connected by the midpoint. Act 706 involves assigning the sampled color value to the midpoint for the subdivided segments within the polygonal mesh. Act 706 can further involve adding the subdivided segments into the priority queue based on updated error scores for the subdivided segments.

Additionally, act 706 involves subdividing the polygonal mesh within the two-dimensional digital vector image until meeting a subdivision threshold. For example, act 706 involves subdividing the polygonal mesh until meeting a maximum number of subdivision steps. In one or more embodiments, act 706 involves determining one or more threshold values associated with determining error scores for segments in the polygonal mesh, a number of times each segment has been previously subdivided, or segment lengths associated with the segments.

According to one or more embodiments, act 706 further involves receiving a request to subdivide the polygonal mesh in a first portion of the two-dimensional digital vector image. For example, act 706 involves detecting a request to zoom in on the first portion of the two-dimensional digital vector image within a graphical user interface. Act 706 can then involve subdividing, in response to the request, the polygonal mesh within the first portion with a higher subdivision priority than a second portion of the two-dimensional digital vector image. Additionally, act 706 involves updating color values for a subset of mesh points for a subdivided portion of the polygonal mesh.

Act 706 involves determining a first value based on the first intersection of the first ray with the vector element of the one or more vector elements by interpolating color values associated with endpoints of the vector element of the one or more vector elements. Act 706 can further involve determining a second value based on the second intersection of the second ray with the bounding shape based on a color value associated with the bounding shape. Act 706 can then involve determining a color value for a first mesh point in the polygonal mesh based on the first value and the second value.

The series of acts 700 also includes an act 708 of modifying the two-dimensional digital vector image based on the color values. For example, act 708 involves modifying the two-dimensional digital vector image based on the color values determined for the mesh points in the polygonal mesh. More specifically, act 708 involves assigning the color values to the mesh points in the polygonal mesh.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
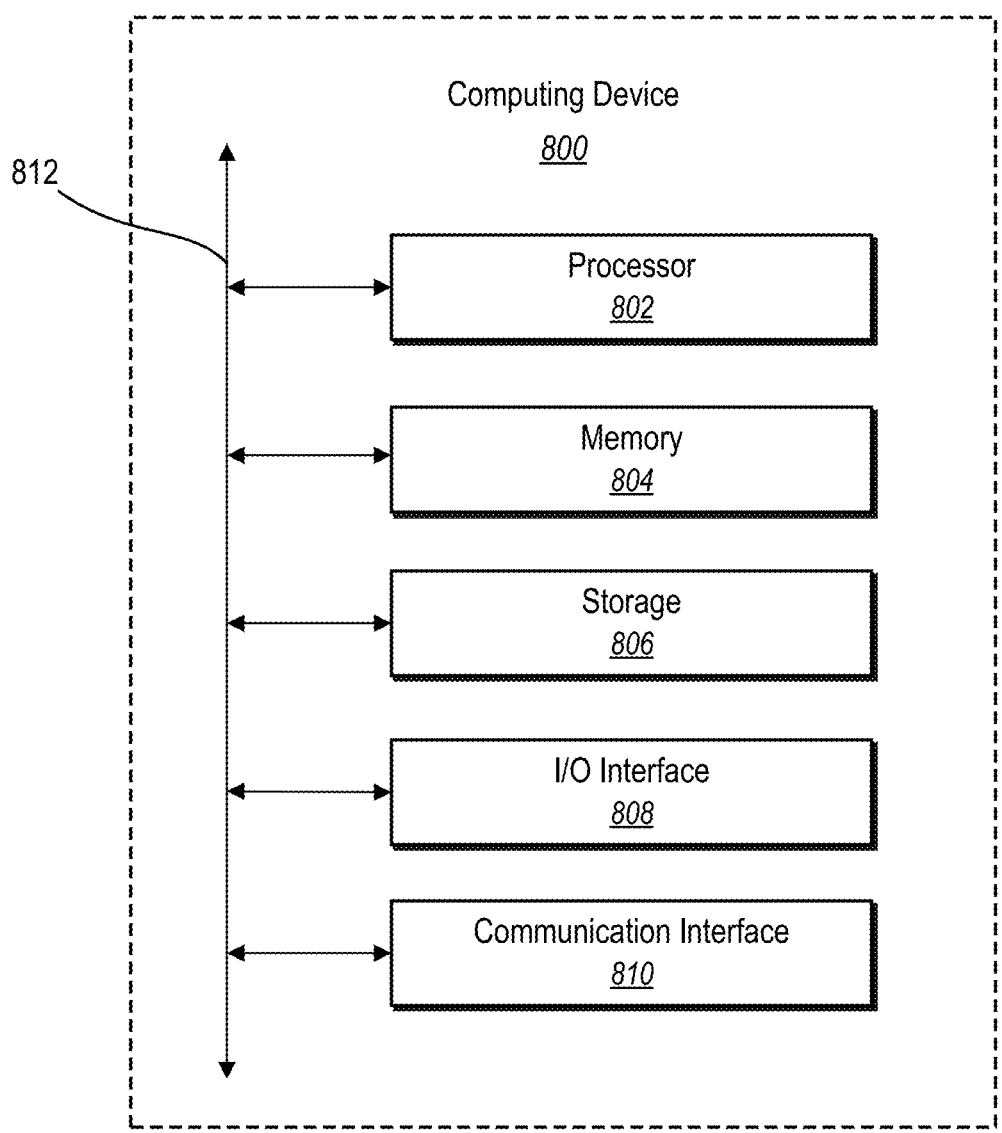
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the system(s) of FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
embedding, by at least one processor in response to inserting one or more light sources into a two-dimensional digital vector image, one or more vector elements of the two-dimensional digital vector image within a polygonal mesh generated for a region of the two-dimensional digital vector image;
sampling, based on the one or more light sources in the two-dimensional digital vector image, a plurality of rays for a plurality of points within the region;
determining, by the at least one processor, color values for mesh points in the polygonal mesh based on intersections of the plurality of rays with the one or more vector elements or a bounding shape enclosing the region; and
modifying, by the at least one processor, the two-dimensional digital vector image based on the color values determined for the mesh points in the polygonal mesh.

2. The computer-implemented method as recited in claim 1, wherein embedding the one or more vector elements of the two-dimensional digital vector image within the polygonal mesh comprises:
generating the bounding shape as a vector rectangle element enclosing the region in response to inserting the one or more light sources into the two-dimensional digital vector image; and
assigning a background color value to the vector rectangle element.

3. The computer-implemented method as recited in claim 1, wherein embedding the one or more vector elements of the two-dimensional digital vector image within the polygonal mesh comprises generating a triangular mesh comprising a plurality of vertices including vertices of the one or more vector elements based on a subdivision setting for the two-dimensional digital vector image.

4. The computer-implemented method as recited in claim 1, wherein determining the color values for the mesh points comprises:
determining an intersection color value corresponding to an intersection of a ray at a particular point of the plurality of points within the region; and
determining a color value for a mesh point in the polygonal mesh based on the intersection color value by interpolating from the particular point to the mesh point.

5. The computer-implemented method as recited in claim 1, wherein determining the color values for the mesh points comprises:
determining initial color values for the mesh points in the polygonal mesh; and
generating a priority queue comprising segments of the polygonal mesh based on error scores associated with the segments.

6. The computer-implemented method as recited in claim 5, further comprising determining an error score of a particular segment in a top position of the priority queue by:
determining a sampled color value for a midpoint of the particular segment in the polygonal mesh by sampling a plurality of rays from a midpoint of the particular segment to an intersection of one or more rays of the plurality of rays with the one or more vector elements or the bounding shape;
determining an estimated color value for the midpoint by interpolating end point color values corresponding to end points of the particular segment; and
generating an error score for the particular segment based on a difference between the sampled color value and the estimated color value.

7. The computer-implemented method as recited in claim 6, further comprising:
subdividing the particular segment into subdivided segments connected by the midpoint;
assigning the sampled color value to the midpoint for the subdivided segments within the polygonal mesh; and
adding the subdivided segments into the priority queue based on updated error scores for the subdivided segments.

8. The computer-implemented method as recited in claim 1, further comprising subdividing segments of the polygonal mesh within the two-dimensional digital vector image until one or more subdivision thresholds are reached.

9. The computer-implemented method as recited in claim 1, further comprising:
receiving a selection of a first portion of the two-dimensional digital vector image, the two-dimensional digital vector image comprising the first portion corresponding to a first vector element and a second portion corresponding to a second vector element; and
subdividing, in response to the selection of the first portion, the first vector element of the first portion according to a higher subdivision priority than the second vector element of the second portion of the two-dimensional digital vector image.

10. A system comprising:
one or more memory devices comprising a two-dimensional digital vector image; and
one or more processors configured to cause the system to:
generate, in response to a request to insert one or more light sources into the two-dimensional digital vector image, a bounding shape for a region comprising one or more vector elements of the two-dimensional digital vector image;
embed the one or more vector elements within a polygonal mesh generated within the bounding shape by connecting the one or more vector elements to the polygonal mesh;
sample, based on the one or more light sources in the two-dimensional digital vector image, a plurality of rays for a plurality of points within the region to determine a plurality of intersections of the plurality of rays with the one or more vector elements or the bounding shape;
determine color values for mesh points in the polygonal mesh by interpolating the color values based on the plurality of intersections of the plurality of rays with the one or more vector elements or the bounding shape; and
modify the two-dimensional digital vector image by assigning the color values to the mesh points in the polygonal mesh.

11. The system as recited in claim 10, wherein the one or more processors are further configured to cause the system to embed the one or more vector elements within the polygonal mesh by:
determining vertices of the one or more vector elements;
determining a subdivision threshold corresponding to the two-dimensional digital vector image; and
generating, according to the subdivision threshold, the polygonal mesh comprising the vertices of the one or more vector elements and additional vertices corresponding to a plurality of additional mesh polygons within the region generated.

12. The system as recited in claim 10, wherein the one or more processors are further configured to cause the system to sample the plurality of rays for the plurality of points within the region by:
   sampling a first ray in a first direction and a second ray in a second direction from a point within the region;
   determining a first intersection of the first ray with a vector element of the one or more vector elements; and
   determining a second intersection of the second ray with a second vector of the bounding shape.

13. The system as recited in claim 12, wherein the one or more processors are further configured to cause the system to determine the color values for the mesh points in the polygonal mesh by:
   determining a first value based on the first intersection of the first ray with the vector element of the one or more vector elements by interpolating color values associated with endpoints of the vector element of the one or more vector elements;
   determining a second value based on the second intersection of the second ray with the bounding shape based on a color value associated with the bounding shape; and
   determining a color value for a first mesh point in the polygonal mesh based on the first value and the second value.

14. The system as recited in claim 10, wherein the one or more processors are further configured to determine the color values for the mesh points in the polygonal mesh by:
   generating an initial polygonal mesh comprising a first set of segments;
   determining first color values for a first set of mesh points in the first set of segments;
   determining a priority queue for subdividing the initial polygonal mesh based on error scores corresponding to the first set of segments;
   generating a subdivided polygonal mesh comprising a second set of segments based on the priority queue; and
   determining second color values for a second set of mesh points in the second set of segments.

15. The system as recited in claim 14, wherein the one or more processors are further configured to determine the error scores corresponding to the first set of segments by:
   determining, for a plurality of midpoints of the first set of segments, sampled color values by sampling rays from the plurality of midpoints to the one or more vector elements or the bounding shape;
   determining estimated color values for the plurality of midpoints by interpolating end point color values corresponding to end points of the first set of segments;
   generating the error scores corresponding to the first set of segments based on the sampled color values and the estimated color values; and
   ranking the first set of segments within the priority queue according to the error scores corresponding to the first set of segments.

16. The system as recited in claim 15, wherein the one or more processors are further configured to generate the error scores corresponding to the first set of segments based on segment lengths of the first set of segments relative to a segment length threshold.

17. A non-transitory computer readable storage medium comprising instructions that, when executed by at least one processor, cause a computing device to:
   assign a light source to a vector element of a two-dimensional digital vector image comprising one or more vector elements;
   embed, in response to assigning the light source to the vector element, the one or more vector elements of the two-dimensional digital vector image within a polygonal mesh generated for a region of the two-dimensional digital vector image enclosed by a bounding shape;
   sample, based on the light source assigned to the vector element, a plurality of rays at a plurality of locations within the region;
   determine color values for mesh points in the polygonal mesh based on intersections of the plurality of rays with the vector element comprising the light source or the bounding shape; and
   modify the two-dimensional digital vector image based on the color values determined for the mesh points in the polygonal mesh and the light source assigned to the vector element.

18. The non-transitory computer readable storage medium as recited in claim 17, further comprising instructions that, when executed by the at least one processor, cause the computing device to:
   detect a request to zoom in on a portion of the two-dimensional digital vector image within a graphical user interface;
   subdivide, in response to the request to zoom in on the portion of the two-dimensional digital vector image, a portion of the polygonal mesh within the portion of the two-dimensional digital vector image; and
   update color values for a subset of mesh points for the subdivided portion of the polygonal mesh.

19. The non-transitory computer readable storage medium as recited in claim 17, further comprising instructions that, when executed by the at least one processor, cause the computing device to determine the color values for the mesh points in the polygonal mesh by determining a color value for a particular mesh point in the polygonal mesh based on a first intersection of a first ray with the vector element comprising the light source and a second intersection of a second ray with the bounding shape.

20. The non-transitory computer readable storage medium as recited in claim 19, further comprising instructions that, when executed by the at least one processor, cause the computing device to determine the color value for the particular mesh point by:
   determining a first intersection color value corresponding to the first intersection based on a light source color value assigned to the vector element comprising the light source;
   determining a second intersection color value corresponding to the second intersection based on a background color value assigned to the bounding shape; and
   determining the color value for the particular mesh point based on the first intersection color value and the second intersection color value.

* * * * *